(12) United States Patent
Abe

(10) Patent No.: US 10,838,703 B2
(45) Date of Patent: Nov. 17, 2020

(54) INFORMATION PROCESSING APPARATUS AND CONTROL METHOD THEREFOR

(71) Applicant: CANON KABUSHIKI KAISHA, Tokyo (JP)

(72) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/385,459

(22) Filed: Dec. 20, 2016

(65) Prior Publication Data

US 2017/0102932 A1  Apr. 13, 2017

Related U.S. Application Data

(63) Continuation of application No. 12/245,292, filed on Oct. 3, 2008, now abandoned.

(30) Foreign Application Priority Data

Oct. 5, 2007 (JP) .................................. 2007-262272

(51) Int. Cl.
*G06F 9/44* (2018.01)
*G06F 9/45* (2006.01)
*G06F 9/445* (2018.01)
*G06F 8/61* (2018.01)
*G06F 9/4401* (2018.01)

(52) U.S. Cl.
CPC .............. *G06F 8/61* (2013.01); *G06F 9/4411* (2013.01)

(58) Field of Classification Search
CPC ........................... G06F 8/61–65; G06F 9/4411
See application file for complete search history.

(56) References Cited

U.S. PATENT DOCUMENTS

| 6,561,907 | B2* | 5/2003 | Shimizu | A63F 13/10 463/31 |
| 6,924,826 | B1* | 8/2005 | Nakagiri | G06F 3/1204 358/1.15 |
| 7,206,828 | B1* | 4/2007 | Bourke-Dunphy | G06F 9/44505 709/221 |
| 7,478,383 | B2* | 1/2009 | Shahindoust | G06F 8/65 717/172 |
| 7,668,154 | B2* | 2/2010 | Aso | H04W 48/18 370/329 |
| 7,769,837 | B2* | 8/2010 | Nogawa | H04L 41/0806 370/338 |
| 7,804,609 | B2* | 9/2010 | Voskuil | G06F 3/1204 358/1.15 |

(Continued)

OTHER PUBLICATIONS

R.K.deBry, Architectures of Advanced Function, 1988, pp. 234-244. https://ieeexplore.ieee.org/stamp/stamp.jsp?tp=&arnumber=5387626 &isnumber=5387614 (Year: 1988).*

*Primary Examiner* — Mongbao Nguyen

(74) *Attorney, Agent, or Firm* — Canon U.S.A., Inc. I.P. Division

(57) ABSTRACT

If a device driver is simply installed in the same manner for any network environment, there is a possibility that the device driver is installed in a manner improper for a particular network environment. To avoid the above problem, an information processing apparatus selects an optimum installation mode according to property information of the information processing apparatus and property information of an image forming apparatus.

10 Claims, 27 Drawing Sheets

(56) References Cited

U.S. PATENT DOCUMENTS

| | | | | |
|---|---|---|---|---|
| 8,346,903 B2* | 1/2013 | Shepherd | G06F 3/1226 | 455/456.6 |
| 2002/0002077 A1* | 1/2002 | Shimizu | A63F 13/10 | 463/30 |
| 2002/0144192 A1* | 10/2002 | Owari | H04N 1/00408 | 714/46 |
| 2002/0156947 A1* | 10/2002 | Nishio | G06F 9/4411 | 710/36 |
| 2002/0166001 A1* | 11/2002 | Cheng | G06F 8/62 | 710/1 |
| 2004/0190033 A1* | 9/2004 | Ferlitsch | G06F 3/1204 | 358/1.13 |
| 2004/0239984 A1* | 12/2004 | Ishii | G06Q 10/063 | 358/1.15 |
| 2004/0250075 A1* | 12/2004 | Anthe, II | H04L 63/0823 | 713/175 |
| 2005/0134904 A1* | 6/2005 | Voskuil | G06F 3/1204 | 358/1.15 |
| 2005/0200889 A1* | 9/2005 | Oomura | G03G 15/5079 | 358/1.15 |
| 2005/0257126 A1* | 11/2005 | Hagiuda | G06Q 10/10 | 715/273 |
| 2005/0267989 A1* | 12/2005 | Yamamoto | G06K 15/00 | 709/245 |
| 2005/0277412 A1* | 12/2005 | Anderson | H04L 12/2854 | 455/435.1 |
| 2006/0023693 A1* | 2/2006 | Aso | H04W 48/18 | 370/351 |
| 2006/0031832 A1* | 2/2006 | Kishida | G06F 8/61 | 717/176 |
| 2006/0047859 A1* | 3/2006 | Cavalaris | G06F 9/4411 | 710/8 |
| 2006/0209333 A1* | 9/2006 | Takida | G07C 13/02 | 358/1.15 |
| 2006/0248522 A1* | 11/2006 | Lakshminarayanan | G06F 8/61 | 717/174 |
| 2006/0256364 A1* | 11/2006 | Yamamoto | G06F 21/608 | 358/1.14 |
| 2006/0279775 A1* | 12/2006 | Matsumoto | G06F 3/1204 | 358/1.15 |
| 2007/0058190 A1* | 3/2007 | Harumichi | H04N 1/32106 | 358/1.13 |
| 2007/0091344 A1* | 4/2007 | Taneda | G06F 3/1206 | 358/1.13 |
| 2007/0124436 A1* | 5/2007 | Shepherd | G06F 3/1226 | 709/223 |
| 2007/0201091 A1* | 8/2007 | Tanaka | G06F 3/1204 | 358/1.16 |
| 2007/0234400 A1* | 10/2007 | Yanagi | G06F 21/608 | 726/1 |
| 2007/0239860 A1* | 10/2007 | Shirai | H04L 29/12264 | 709/221 |
| 2007/0282974 A1* | 12/2007 | Nagoshi | H04N 1/00244 | 709/217 |
| 2008/0007767 A1* | 1/2008 | Ishimaru | G06F 21/35 | 358/1.15 |
| 2008/0037062 A1* | 2/2008 | Omino | G06F 21/305 | 358/1.15 |
| 2008/0040712 A1* | 2/2008 | Tanaka | H04N 1/00244 | 717/168 |
| 2008/0123130 A1* | 5/2008 | Matsumoto | G06F 3/1207 | 358/1.15 |
| 2008/0130047 A1* | 6/2008 | Shudo | H04N 1/00222 | 358/1.15 |
| 2008/0151295 A1* | 6/2008 | Lee | H04L 29/12216 | 358/1.15 |
| 2008/0192282 A1* | 8/2008 | Nakaota | G06F 3/1204 | 358/1.15 |
| 2008/0246986 A1* | 10/2008 | Scrafford | H04L 41/12 | 358/1.15 |
| 2009/0080011 A1* | 3/2009 | Shen | G06F 9/4415 | 358/1.15 |

* cited by examiner

←→ DENOTES ADDRESS DATA BUS

FIG. 4
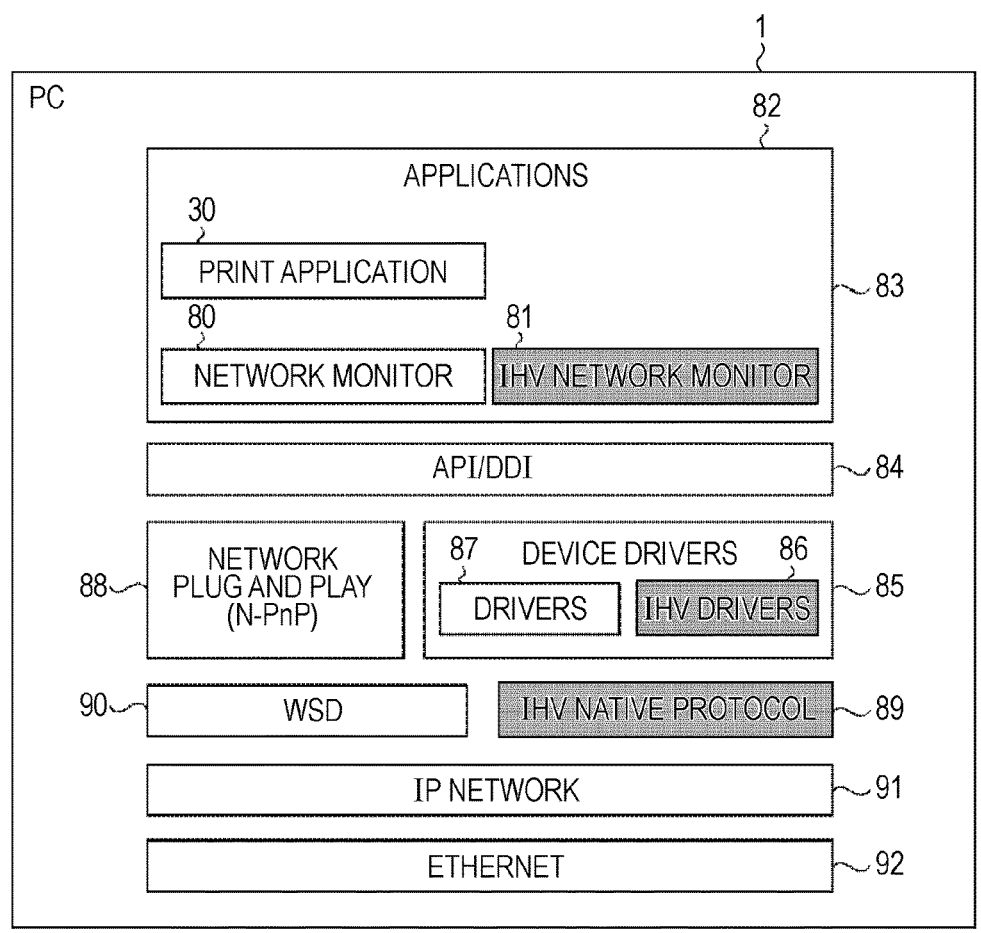
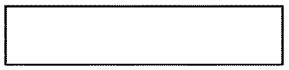 ··· MODULE INCLUDED AS STANDARD IN OS
 ··· MODULE PROVIDED BY IHV

SELECT YOUR COMPUTER'S LOCATION

HOME
CHOOSE THIS FOR A HOME. YOUR COMPUTER
IS DISCOVERABLE AND YOU CAN SEE OTHER ~ 47
COMPUTERS AND DEVICES.

OFFICE
CHOOSE THIS FOR A WORKPLACE. YOUR
COMPUTER IS DISCOVERABLE AND YOU CAN ~ 48
SEE OTHER COMPUTERS AND DEVICES.

PUBLIC
CHOOSE THIS FOR PUBLIC PLACES.
DISCOVERY OF OTHER COMPUTERS AND ~ 49
DEVICES LIMITED.

UNSPECIFIED
~ 77

FIG. 9

```
<?xml version="1.0" ?>
<env:Envelope xmlns:env="http://www.w3.org/2003/05/soap-envelope"
xmlns:wsa="http://schemas.xmlsoap.org/ws/2004/08/addressing"
xmlns:mex="http://schemas.xmlsoap.org/ws/2004/09/mex"
xmlns:wsdp="http://schemas.xmlsoap.org/ws/2006/02/devprof"
xmlns:disc="http://schemas.xmlsoap.org/ws/2005/04/discovery"         78
xmlns:wprt="http://schemas.yyyy.xxx/YYYY/MM/wdp/print"
xmlns:npnp="http://schemas.yyyy.xxx/npnp/YYYY/MM">
<env:Header>
<wsa:Action>http://schemas.xmlsoap.org/ws/2004/09/transfer/GetResponse</wsa:Action>
<wsa:MessageID>%MESSAGE_ID%</wsa:MessageID>
<wsa:RelatesTo>%RELATES_TO%</wsa:RelatesTo>
<wsa:To>%TO%</wsa:To>
</env:Header>                                                        107
<env:Body>
<mex:Metadata>
<mex:MetadataSection Dialect="http://schemas.xmlsoap.org/ws/2006/02/devprof/ThisDevice">
<wsdp:ThisDevice>
<wsdp:FriendlyName xml:lang="en-US">ABC Kmmn</wsdp:FriendlyName>
<wsdp:FirmwareVersion>1.00</wsdp:FirmwareVersion>   73
<wsdp:SerialNumber>8888</wsdp:SerialNumber>                          74
<npnp:Location>Home</npnp:Location>
<npnp:IhvSoftwareUrl>http://www.ABC.xxx/software/default.aspx</npnp:IhvSoftwareUrl>
</wsdp:ThisDevice>
</mex:MetadataSection>
<mex:MetadataSection Dialect="http://schemas.xmlsoap.org/ws/2006/02/devprof/ThisModel">
<wsdp:ThisModel>
<wsdp:Manufacturer xml:lang="en-US">ABC</wsdp:Manufacturer>
<wsdp:ManufacturerUrl>http://www.ABC.xxx</wsdp:ManufacturerUrl>
<wsdp:ModelName xml:lang="en-US">Kmmn</wsdp:ModelName>
<wsdp:ModelUrl>http://www.ABC.xxx/kmmn.htm</wsdp:ModelUrl>           72
<wsdp:PresentationUrl>http://192.168.0.100:8000</wsdp:PresentationUrl>
<npnp:DeviceCategory>Printers</npnp:DeviceCategory>
</wsdp:ThisModel>
</mex:MetadataSection>
<mex:MetadataSection Dialect="http://schemas.xmlsoap.org/ws/2006/02/devprof/Relationship">
<wsdp:Relationship Type="http://schemas.xmlsoap.org/ws/2006/02/devprof/host">
<wsdp:Hosted>
<wsa:EndpointReference>
<wsa:Address>http://192.168.0.100:4000/Printer</wsa:Address>
</wsa:EndpointReference>
<wsdp:Types>wprt:PrinterServiceType</wsdp:Types>
<wsdp:ServiceId>uri:schemas.ABC.xxx/PrinterServiceId</wsdp:ServiceId>
<npnp:CompatibleId>
http://schemas.yyyy.xxx/YYYY/MM/wdp/print/PrinterServiceType
</npnp:CompatibleId>
</wsdp:Hosted>
</wsdp:Relationship>
</mex:MetadataSection>
</mex:Metadata>
</env:Body>
</env:Envelope>
```

FIG. 10A

Firewall: On

| PC Location | Network Discovery | Device Installaction |
|---|---|---|
| Home | On | Automatic/Manual |
| Office | Automatic/Manual | Automatic/Manual |
| Public | Off | Unavailable |
| Unspecified | On | Automatic/Manual |

FIG. 10B

Firewall: Off

| PC Location | Network Discovery | Device Installaction |
|---|---|---|
| Home | On | Automatic/Manual |
| Office | On | Automatic/Manual |
| Public | On | Manual |
| Unspecified | On | Automatic/Manual |

FIG. 11

| PC Location | npnp: Location | Network Monitor | Install | npnp: Device Category | Remark |
|---|---|---|---|---|---|
| Home | Home | Displayed | Auto | Printers/Scanners/MFP | Home peripheral device is used at home as expected |
| | | Displayed | Manual | Others | Home peripheral device is used at home as expected |
| | Office | Displayed | Manual | Any | Office peripheral device is used exceptionally at home |
| | Public | Not displayed | Not allowed | Any | Public-place peripheral device is used exceptionally at home |
| | None | Displayed | Auto | Printers/Scanners/MFP | Any-purpose peripheral device is used at home |
| | | Displayed | Manual | Others | Any-purpose peripheral device is used at home |
| | Undefined | Displayed | Auto | Printers/Scanners/MFP | Unknown-purpose peripheral device is used at home |
| | | Displayed | Manual | Others | Unknown-purpose peripheral device is used at home |
| Office | Home | Displayed | Manual | Any | Home peripheral device is exceptionally used in office |
| | Office | Displayed | Manual | Any | Office peripheral device is used in office as expected |
| | Public | Not displayed | Not allowed | Any | Public-place peripheral device is exceptionally used in office |
| | None | Displayed | Manual | Any | Any-purpose peripheral device is used in office |
| | Undefined | Displayed | Manual | Any | Unknown-purpose peripheral device is used in office |
| Public | Home | Not displayed | Not allowed | Any | Home peripheral device is exceptionally used at public place |
| | Office | Not displayed | Not allowed | Any | Public peripheral device is exceptionally used at public place |
| | Public | Displayed | Manual | Any | Public-place peripheral device is used at public place as expected |
| | None | Not displayed | Not allowed | Any | Any-purpose peripheral device is used at public place |
| | Undefined | Not displayed | Not allowed | Any | Unknown-purpose peripheral device is used at public place |
| Unspecified | Home | Displayed | Auto | Printers/Scanners/MFP | Home peripheral device is used at any place |
| | | Displayed | Manual | Others | Home peripheral device is used at any place |
| | Office | Displayed | Manual | Any | Office peripheral device is used at any place |
| | Public | Not displayed | Not allowed | Any | Public-place peripheral device is used at any place |
| | None | Displayed | Manual | Any | Any-purpose peripheral device is used at any place |
| | Undefined | Displayed | Manual | Any | Unknown-purpose peripheral device is used at any place |

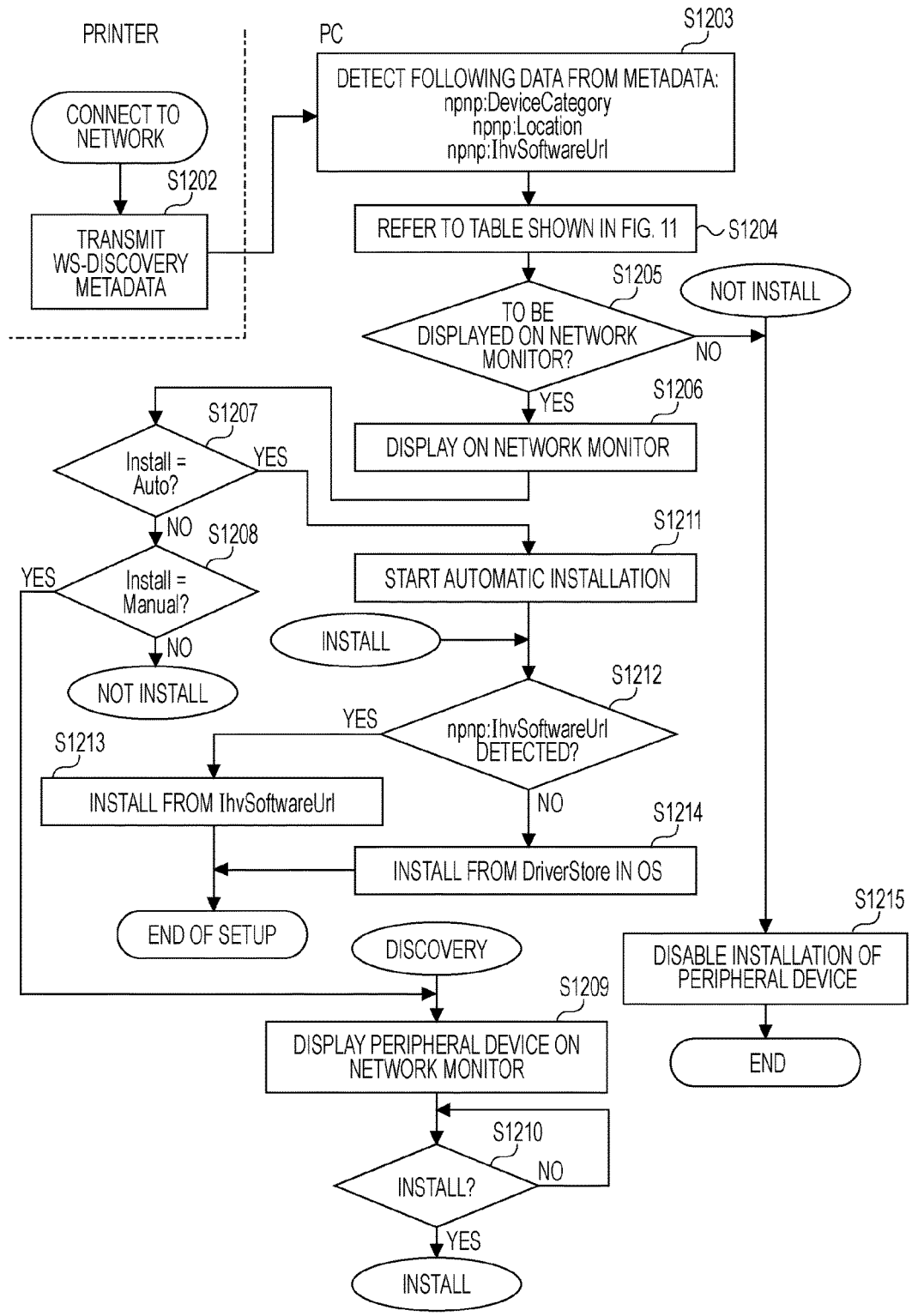

FIG. 18

```
<?xml version="1.0" ?>
<env:Envelope xmlns:env="http://www.w3.org/2003/05/soap-envelope"
xmlns:wsa="http://schemas.xmlsoap.org/ws/2004/08/addressing"
xmlns:ABCpc="http://www.ABC.xxx/schemas/passcodes">              96    97
<env:Header>
<wsa:Action>http://www.ABC.xxx/schemas/passcodes/Send</wsa:Action>
<wsa:MessageID>%MESSAGE_ID%</wsa:MessageID>
<wsa:To>%TO%</wsa:To>
</env:Header>
<env:Body>                                                       75
<ABCpc:Passcodes>4649</ABCpc:Passcodes>
</env:Body>
</env:Envelope>
```

FIG. 19

```
<?xml version="1.0" ?>
<env:Envelope xmlns:env="http://www.w3.org/2003/05/soap-envelope"
xmlns:wsa="http://schemas.xmlsoap.org/ws/2004/08/addressing"
xmlns:ABCpc="http://www.ABC.xxx/schemas/passcodes">                   98
<env:Header>
<wsa:Action>http://www.ABC.xxx/schemas/passcodes/Reply</wsa:Action>
<wsa:MessageID>%MESSAGE_ID%</wsa:MessageID>
<wsa:To>%TO%</wsa:To>
</env:Header>
<env:Body>                                                       76
<ABCpc:Result>Valid</ABCpc:Result>
</env:Body>
</env:Envelope>
```

FIG. 24

| PC Location | npnp: Location | IHV Network Monitor | Install | npnp: Device Category | Remark |
|---|---|---|---|---|---|
| Home | Home | Displayed | Auto | Printers/Scanners/MFP | Home peripheral device is used at home as expected |
| | | Displayed | Manual | Others | Home peripheral device is used at home as expected |
| | Office | Displayed | Manual | Office | Office peripheral device is used exceptionally at home |
| | Public | Not displayed | Not allowed | Any | Public-place peripheral device is used exceptionally at home |
| | None | Displayed | Auto | Printers/Scanners/MFP | Any-purpose peripheral device is used at home |
| | | Displayed | Manual | Others | Any-purpose peripheral device is used at home |
| | Undefined | Displayed | Auto | Printers/Scanners/MFP | Unknown-purpose peripheral device is used at home |
| | | Displayed | Manual | Others | Unknown-purpose peripheral device is used at home |
| Office | Home | Displayed | Auto | Printers/Scanners/MFP | Home peripheral device is exceptionally used in office |
| | | Displayed | Manual | Others | Home peripheral device is exceptionally used in office |
| | Office | Displayed | Manual | Any | Office peripheral device is used in office as expected |
| | Public | Not displayed | Not allowed | Any | Public-place peripheral device is exceptionally used in office |
| | None | Displayed | Manual | Any | Any-purpose peripheral device is used in office |
| | Undefined | Displayed | Manual | Any | Unknown-purpose peripheral device is used in office |
| Public | Home | Displayed | Manual | Printers/Scanners/MFP | Home peripheral device is exceptionally used at public place |
| | | Not displayed | Not allowed | Others | Home peripheral device is exceptionally used at public place |
| | Office | Not displayed | Not allowed | Any | Public peripheral device is exceptionally used at public place |
| | Public | Displayed | Manual | Any | Public-place peripheral device is used at public place as expected |
| | None | Not displayed | Not allowed | Any | Any-purpose peripheral device is used at public place |
| | Undefined | Not displayed | Not allowed | Any | Unknown-purpose peripheral device is used at public place |
| Unspecified | Home | Displayed | Auto | Printers/Scanners/MFP | Home peripheral device is used at any place |
| | | Displayed | Manual | Others | Home peripheral device is used at any place |
| | Office | Displayed | Manual | Any | Office peripheral device is used at any place |
| | Public | Not displayed | Not allowed | Any | Public-place peripheral device is used at any place |
| | None | Displayed | Manual | Any | Any-purpose peripheral device is used at any place |
| | Undefined | Displayed | Manual | Any | Unknown-purpose peripheral device is used at any place |

FIG. 25

```
<?xml version="1.0" ?>
<env:Envelope xmlns:env="http://www.w3.org/2003/05/soap-envelope"
xmlns:wsa="http://schemas.xmlsoap.org/ws/2004/08/addressing"
xmlns:disc="http://schemas.xmlsoap.org/ws/2005/04/discovery">
<env:Header>
<wsa:Action>http://schemas.xmlsoap.org/ws/2005/04/discovery/Hello</wsa:Action>
<wsa:MessageID>%MESSAGE_ID%</wsa:MessageID>
<wsa:To>%TO%</wsa:To>
<disc:AppSequence InstanceId="%INSTANCE_ID%" />
</env:Header>
<env:Body>
<disc:Hello>
<wsa:EndpointReference>
<wsa:Address>%ADDRESS%</wsa:Address>
</wsa:EndpointReference>
<disc:MetadataVersion>75965</disc:MetadataVersion>
</disc:Hello>
</env:Body>
</env:Envelope>
```

FIG. 26

DIRECTORY INFORMATION MANAGEMENT ~131

PROGRAM STORAGE AREA
· DATA PROCESSING PROGRAM
· SETS OF PROGRAM CODES
  CORRESPONDING TO STEPS SHOWN
  IN FLOW CHARTS
· ETC.
~132

|  | Home | Office | Public |
|---|---|---|---|
| Types of Devices/PC | TV/Game/DVD/PC/MFP | PC/MFP | Unknown |
| Number of PCs | 1-5 | 20-100 or more | Unknown |
| Number of Devices | 2-8 | 5-10 or more | Unknown |
| Maintained by | Someone in the Home | Network administrators | Unknown |

INFORMATION PROCESSING APPARATUS AND CONTROL METHOD THEREFOR

CROSS-REFERENCE TO RELATED APPLICATIONS

This application is a continuation, and claims the benefit, of U.S. patent application Ser. No. 12/245,292, presently pending and filed on Oct. 3, 2008, and claims the benefit of, and priority to, Japanese Patent Application No. 2007-262272 filed Oct. 5, 2007, which applications are hereby incorporated by reference herein in their entireties.

BACKGROUND OF THE INVENTION

Field of the Invention

The present invention relates to an information processing apparatus and a control method therefore.

Description of the Related Art

In recent years, an improvement in infrastructures associated with networks has been achieved. This has led to widespread use of various kinds of network-connected or network-connectable apparatuses such as a printer, a copying machine, a facsimile machine, a scanner, a digital camera, an MFP (Multi Function Peripheral) having a plurality of functions, etc. Hereinafter, these apparatuses will be generically referred to as peripheral devices/apparatuses. Accordingly, various techniques have been developed as to a user operation or internal control in installation of a driver of a network-connected/connectable peripheral apparatus in an information processing apparatus. In particular, it has become popular to use a network at a home. Network environments can be classified into three main groups: home network environments, office network environments, and public network environments.

FIG. 27 is a list comparatively illustrating three categories of network environments, i.e., home environments, office environments, and public environments. In this list shown in FIG. 27, a "home" column describes features of a home network environment, an "office" column describes features of an office network environment, and a "public" column describes features of a public network environment. Examples of public network environments are those at air ports, cafes, etc. In rows of the list, items are described to indicate features of the respective environments. More specifically, in a field at the intersection of a row "Types of Devices/PC" and the column "home", it is described that types of peripherals or information processing apparatuses used in the home network environment are television sets, game machines, DVD players, information apparatuses, and MFPs (Multi Function Peripherals). In a field at the intersection of the row "Types of Devices/PC" and the column "office", it is described that types of apparatuses used in the office network environment are information processing apparatuses and MFPs. In a field at the intersection of a row "Number of PCs" and the column "home", it is described that the number of information processing apparatuses used in the home network environment is 1 to 5. On the other hand, in the office network environment, 20 to 200 apparatuses are used. In a field at the intersection of a row "Number of Devices" and the column "home", it is described that the number of peripherals used in the home network environment is 2 to 8. On the other hand, in the office network environment, 5 to 10 peripherals are used. For example, one printer used as one of peripherals in the home network environment may be shared by all information processing apparatuses in this home network environment.

On the other hand, in an office network environment, two to four or more printers are shared by a plurality of information processing apparatuses depending on requirements in sections or areas of an office or depending on purposes of use (for example, one printer is shared in each section).

In the home network environment, the network is managed or maintained, as described in a row "Managed by", by someone in a home, such as a father of a family. On the other hand, in the office network environment, the network is managed or maintained by a network administrator.

At a public place, the environment can be in various forms, and thus the types of peripherals or information processing apparatuses ("Types of Devices/PCs"), the number of information processing apparatuses ("Number of PCs"), and the number of peripherals ("Number of Devices") are not specified. In public network environments, networks are managed or maintained by third parties having no particular relationships with users of the network environments.

Some recent information processing apparatuses have Microsoft Windows Vista (registered trademark) installed therein as an OS (Operating System).

Peripheral apparatuses can be classified into two types: high-performance printers for use in offices, such as laser beam printers or copy machines having a network communication capability; and home-use printers (such as an ink-jet printer) having a network communication capability whose performance is low compared with the performance of office printers.

To set up an information processing apparatus to use a printer, that is, to install a printer driver in the information processing apparatus, a user has to perform an installation operation. A typical installation operation is as follows.

Step 1. A user connects an information processing apparatus to a network via a network cable or the like and starts the information processing apparatus.

Step 2. The user then connects a printer to the network via a network cable or the like and turns on the power of the printer.

Step 3. The user opens a network folder and waits for an icon representing the printer to be displayed in the network folder.

Step 4. The user right-clicks the icon representing the printer in the network folder and selects an "Install" menu.

Step 5. The user inserts a CD-ROM disk or the like on which a driver is stored into the information processing apparatus according to "Found New Hardware Wizard" or the like and installs the driver in the information processing apparatus.

The sequence of installing a driver of a peripheral apparatus (such as a printer) in an information processing apparatus is performed in a similar manner regardless of whether the peripheral apparatus is an office printer or a home printer. In the installation, a "Plug and Play Extensions" (PnP-X) function or a "Web Services on Devices" (WSD) function can be used as required. These two functions are included as standard functions in Windows (registered trademark) Vista OS (Operating System). WSD is equivalent to "Devices Profile for Web Services" available from W3C via the Internet. PnP-X is an extension of "Plug and Play" and it supports a network-connected device.

Japanese Patent Laid-Open No. 2007-066091 discloses a technique of automatically installing a driver. In this technique, a determination is made as to whether a device driver should be installed, depending on a network environment to which an information processing apparatus is connected.

In the conventional installation technique, a driver of a peripheral apparatus (printer) is installed in an information processing apparatus via a user operation in a similar manner regardless of whether the printer is an office printer or a home printer. In a case where a user sets up an office printer in an office network environment managed by a highly-skilled network administrator or the like, it is easy for the user to correctly set up the printer by performing the operation under instruction of the highly-skilled network administrator.

However, in a home network environment that is not managed by a highly-skilled person such as a network administrator, it is not easy for a user to correctly perform installation. Thus, a failure in installation often occurs. If the installation fails, the peripheral apparatus cannot be used.

A technique to solve the above problem is to automate the installation. However, if automatic setup is simply performed for an office printer, device drivers for all printers that are in an on-state and connected to a network are installed in all information processing apparatuses that are in an on-state and connected to the network. As a result, there is a possibility that a printer driver that the user does not want to install is installed.

SUMMARY OF THE INVENTION

In view of the above, the present invention provides a method of setting up a peripheral apparatus in an optimum manner depending on an environment in which the peripheral apparatus is used.

More specifically, the present invention provides an information processing apparatus capable of communicating with an image forming apparatus, including a setting unit configured to set first property information indicating an setup location of the information processing apparatus, and a selection unit configured to select an installation mode such that when the first property information set by the setting unit indicates a first setup location, the selection unit selects an automatic installation mode in which a device driver of the image forming apparatus is automatically installed without accepting an installation command issued by a user, while when the first property information set by the setting unit indicates a second setup location, the selection unit selects a manual installation mode in which the device driver is installed according to the installation command issued by the user.

Further features of the present invention will become apparent from the following description of exemplary embodiments with reference to the attached drawings.

BRIEF DESCRIPTION OF THE DRAWINGS

FIG. 4 is a diagram illustrating a software configuration of a PC.

FIG. 6 is a diagram illustrating a location setting dialog for setting a location of a PC.

FIG. 9 is a diagram illustrating N-PnP information issued by a printer.

FIGS. 10A and 10B are tables indicating relationships among PC locations, network discovery functions, and peripheral device installation modes.

FIG. 11 is a table used to determine a mode of controlling displaying information on a network monitor and a mode of installing a peripheral device.

FIG. 12 is a flow chart illustrating an example of a process of setting up a peripheral device.

FIG. 18 is a diagram illustrating passcode information issued by a PC.

FIG. 19 is a diagram illustrating passcode confirmation information issued by a printer.

FIG. 24 is a table used to determine a mode of controlling displaying information on an IHV network monitor and a mode of installing a peripheral device.

FIG. 25 is a diagram illustrating information associated with WS-Discovery.

FIG. 26 is a diagram illustrating a memory map of a storage medium in which various data processing programs are stored such that they are readable by a peripheral apparatus control system according to an embodiment of the present invention.

FIG. 27 is a list illustrating three categories of network environments, i.e., home network environments, office network environments, and public network environments.

DESCRIPTION OF THE EMBODIMENTS

In the following explanation, a description of SOAP (Simple Object Access Protocol) is omitted because a description thereof can be found on the Internet at W3C. Note that an explanation given in the following description as to Windows (registered trademark) Vista OS is based on information available on the Internet at microsoft.com (as of Aug. 21, 2007).

First Exemplary Embodiment

Figure 1:
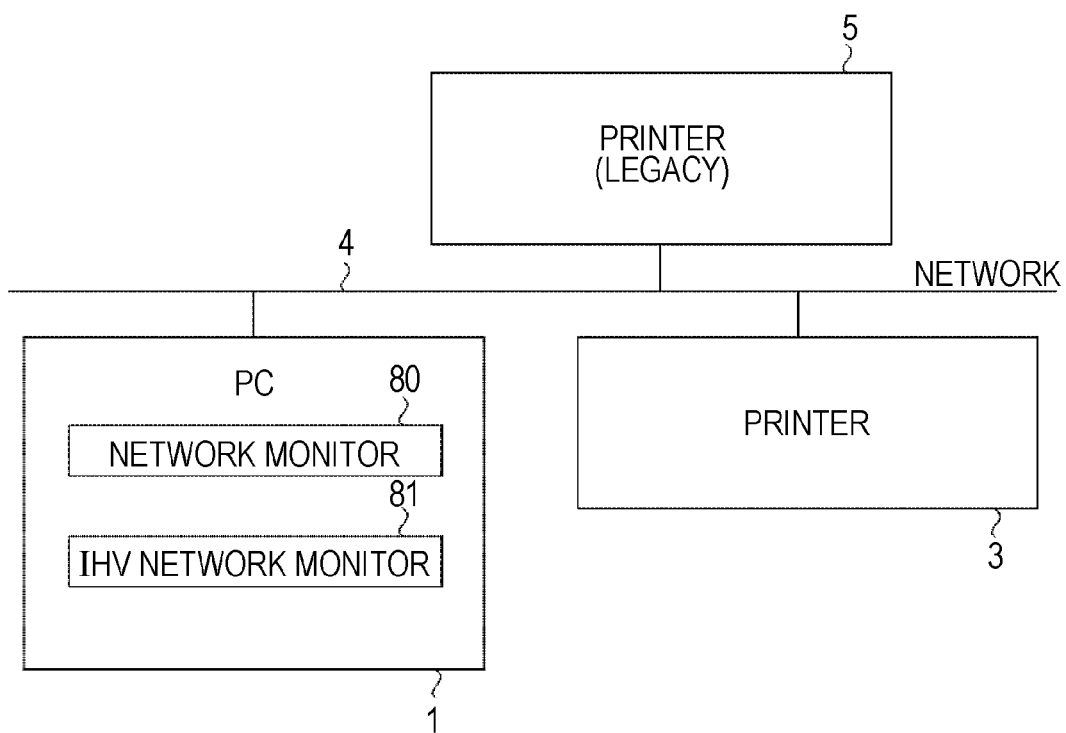
FIG. 1 is a block diagram illustrating a peripheral apparatus control system including an information processing apparatus and peripheral apparatuses, according to an embodiment of the present invention.

FIG. 1 is a block diagram illustrating a printing system including an information processing apparatus and peripheral apparatuses (also referred to as image forming apparatuses) that are connected, for communication, to the information processing apparatus, according to an embodiment of the present invention.

Figure 2:
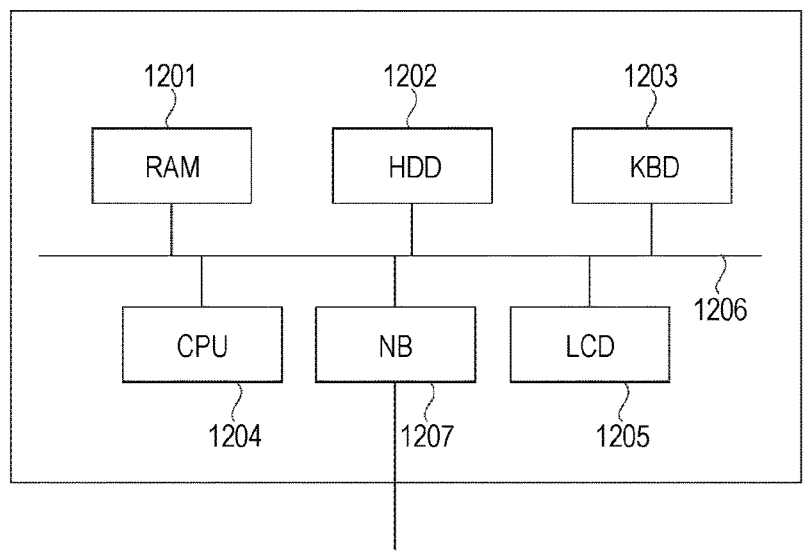
FIG. 2 is a block diagram illustrating an example of hardware configuration of a PC.

In FIG. 1, reference numeral 1 denotes an information processing apparatus. As for the information processing apparatus 1, a personal computer (hereinafter referred to simply as a PC) of a usual type may be used. The PC 1 is configured with hardware in such a manner as shown in FIG. 2, and has an OS (Operating System) such as Microsoft Windows Vista (registered trademark) installed therein. The PC 1 is connected to a network 4 based on Ethernet (registered trademark) technology.

Reference numerals 3 and 5 denote image forming apparatuses such as printers. The printers may be, for example, of a color ink-jet type. In the example shown in FIG. 1, it is assumed that the printer 3 is a printer of model "Kmmn" available from ABC company. The printer 5 is a conventional printer that does not have a function provided by the embodiment of the present invention. In the present embodiment, the peripheral apparatuses (image forming apparatuses) may be a printer, a copying machine, a facsimile machine, a scanner, a digital camera, or a multifunction apparatus having two or more of the functions described above. Each of the printers 3 and 5 is configured with hardware in such a manner as will be described below with reference to FIG. 3, and is connected to the PC 1 via the network 4 such that they can communicate with each other in both directions.

Reference numerals 80 and 81 denote applications executed by the PC 1. The applications 80 and 81 may be given in the form of a file (*.EXE) executable on the Windows (registered trademark) OS. More specifically, in the present embodiment, it is assumed by way of example that the applications 80 and 81 are network monitors such as those shown in FIG. 7 or 22.

Figure 5:
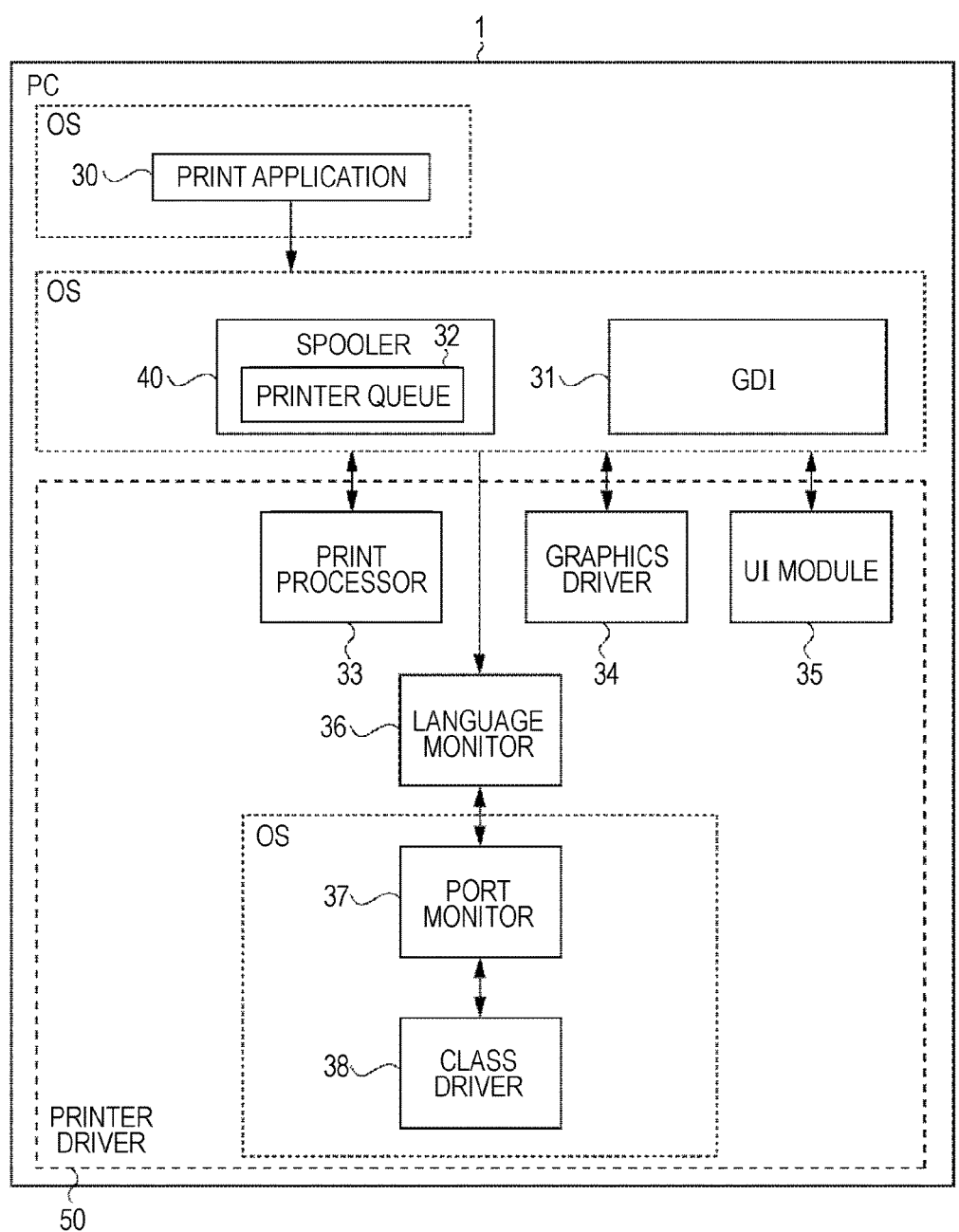
FIG. 5 is a diagram illustrating a configuration of a printer driver of a PC.

FIG. 2 is a block diagram illustrating an example of a hardware configuration of a PC. As shown in this figure, the PC 1 includes a random access memory (RAM 1201), a hard disk drive serving as a storage unit (HDD 1202), and a keyboard serving as an input unit (KBD 1203). The PC 1 further includes a CPU 1204 serving as a control unit, a display (LCD 1205), and a network board (NB 1207) serving as a communication controller. The NB 1207 allows the PC 1 to communicate with the image forming apparatuses. In the PC 1, parts 1201 to 1205 and 1207 are connected to each other via a bus 1206. The storage unit is not limited to the hard disk drive, but other devices such as a removable CD-ROM device or a built-in ROM device may be used as the storage unit. Modules (software) shown in FIG. 4 or 5 are stored in the HDD 1202 and read into the RAM 1201 as required and executed by the CPU 1204.

Figure 3:
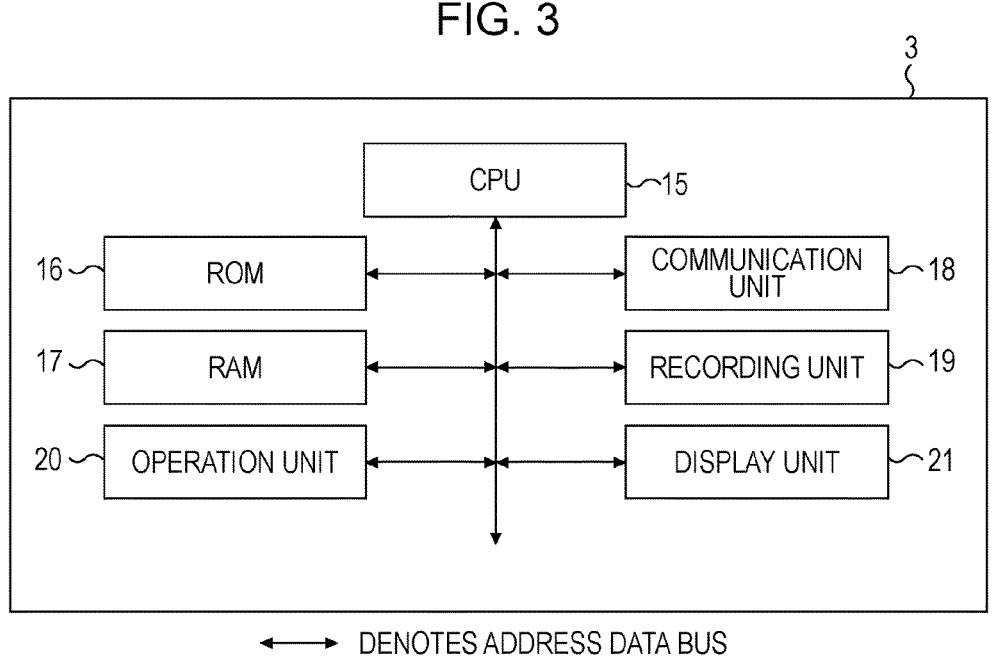
FIG. 3 is a block diagram illustrating a hardware configuration of a printer.

FIG. 3 is a block diagram illustrating a hardware configuration of a printer. The printer 3 and the printer 5 each have a hardware configuration similar to that shown in FIG. 3. In the following description, an explanation is given by way of example for the printer 3.

In FIG. 3, reference numeral 15 denotes a CPU implemented using a microprocessor or the like. In the printer 3, the CPU 15 serves as a central processing unit responsible for controlling a RAM 17, a communication unit 18, a recorder 19, an operation unit 20, and a display according to a program stored in a ROM 16. In the ROM 16, the program is stored such that the printer 3 executes the program stored therein to perform a recording (printing) process, a process of notifying the PC 1 of a status of the printer 3, or other processes under the control of the printer driver 50 (described below with reference to FIG. 5). The RAM 17 is mainly used to temporarily store print data that is received from the PC 1 and that is used by the recorder 19 in a printing operation. The communication unit 18 has a port via which to connect the printer 3 to the network 4, and the communication unit 18 controls Ethernet communication. The recorder 19 includes a recording unit including an ink-jet recording head, color inks, a carriage, and a sheet conveying mechanism. The recorder 19 also includes an electric circuit implemented using an ASIC or the like for generating printing pulses to the recording head according to the print data.

If a user issues a command to perform printing using an application having a printing capability, image data of a file opened on the application is temporarily stored as a spool file in an EMF form in the HDD 1202 of the PC 1. The stored spool file is converted via the printer driver 50 into print data including printer control commands for controlling the printer 3. The resultant print data is sent to the printer 3 via the network 4. In the printer 3, the received print data is converted into printing pulses by the recorder 19 and printed on printing paper. Reference numeral 20 denotes an operation unit including various buttons such as a power button and a reset button for operating the printer 3. Reference numeral 21 denotes a display implemented using a liquid crystal display with a touch panel that is adapted to display the status of the printer 3 and that is also used to input and display various setting parameters. Note that in the present embodiment, it is assumed by way of example but not limitation that the printer 3 is of an ink-jet type.

Figure 14:
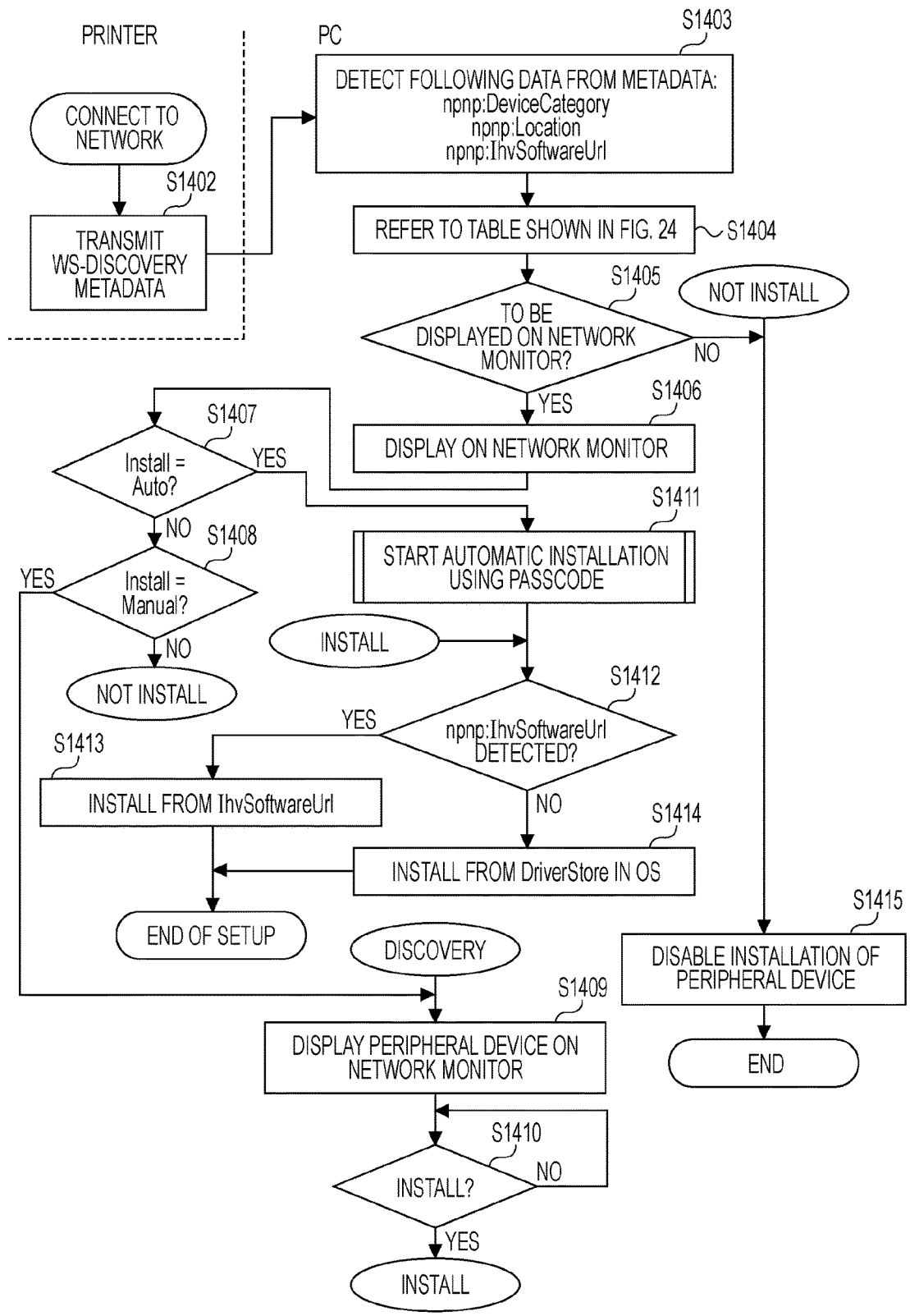
FIG. 14 is a flow chart illustrating an example of a process of setting up a peripheral device.

FIG. 4 is a diagram illustrating a software configuration of a PC. In this figure, reference numeral 92 denotes an Ethernet control stack by which to control an Ethernet network. Reference numeral 91 denotes an IP network control stack adapted to control an IP network. Reference numeral 90 denotes a WSD control stack adapted to control the WSD function. Reference numeral 89 denotes an IHV native protocol control stack adapted to control an IHV-specific protocol. Reference numeral 88 denotes an N-PnP control stack adapted to control a plug-and-play function of a network (hereinafter referred to simply as an N-PnP function). Note that the Windows Vista OS includes as standard function "Plug and Play Extensions (PnP-X)" that supports handling of a network-connected device. In the present embodiment, it is assumed that an N-PnP function similar to PnP-X is used. Reference numeral 85 denotes device drives including a set of standard drivers 87 included as standard in the OS and a set of IHV drivers 86 provided by an IHV (Independent Hardware Vendor). Reference numeral 84 denotes an application/DDI interface including an API (Application Programming Interface) and a DDI (Device Driver Interface). Reference numeral 80 denotes an application. More specifically, in the present embodiment, the application 80 is a network monitor included as standard in the OS. Reference numeral 81 denotes another application. More specifically, in the present embodiment, the application 81 is a network monitor provided by the IHV. Hereinafter, the application 80 will be referred to as the network monitor 80, and the application will be referred to as the IHV network monitor 81. Reference numeral 30 denotes an application having a capability of issuing a print command, which will be described below with reference to FIG. 5. Reference numeral 82 denotes the total set of applications including the network monitor 80, the IHV network monitor 81, and the application 30. An event of WS-Discovery, which will be described below with reference to FIGS. 12, 14, and 25, is notified to the network monitor 80 and the IHV network monitor 81 via the application/DDI interface 84. The network monitor 80 and the IHV network monitor 81 are capable of acquiring detailed information about the printer 3 described in a metadata element 107, such as that shown FIG. 9, via the application/DDI interface 84. The network monitor 80 displays, as will be described below with reference to FIG. 7, FIG. 8, and FIG. 20, an icon 42, an icon 43, an icon 44, and a check box 45 for specifying whether automatic installation of a legacy device is permitted, via the application/DDI interface 84. Furthermore, the network monitor 80 displays an install menu 51, a Web page link menu 52, a property display menu 53, and a uninstall menu 79 via the application/DDI interface 84.

The IHV network monitor 81 displays, as will be described below with reference to FIGS. 22 and 23, an icon 100, an icon 101, and an icon 102, via the application/DDI interface 84. Furthermore, the IHV network monitor 81 displays an install menu 103, a Web page link menu 104, a property display menu, and an uninstall menu 106 via the application/DDI interface 84. The network monitor 80 and the IHV network monitor 81 are capable of installing and uninstalling the printer driver 50 for the printer 3 in or from the PC 1 via the application/DDI interface 84. The IHV network monitor 81 is capable of transmitting passcode information to the printer 3 via the application/DDI interface 84 or acquiring information indicating a confirmation result of the passcode. An example of passcode information will be described below with reference to FIG. 18, and an example of passcode confirmation information will be described below with reference to FIG. 19.

FIG. 5 is a diagram illustrating a configuration of a printer driver of a PC. In this figure, reference numeral 50 denotes a printer driver for the printer 3. The printer driver 50 is installed in the PC 1. The printer driver 50 includes a plurality of modules 33 to 38.

Reference numeral 30 denotes an application capable of issuing a print command. A specific example of the application 30 is a text editor such as "Notepad" (Notepad.exe) included as standard in the OS. Reference numeral 31 denotes a GDI (Graphics Device Interface) that is part of the OS. Reference numeral 32 denotes a printer queue that is a part of a spooler 40 and that functions to queue print jobs. The queued print jobs are displayed in a printer queue folder, although a further detailed description thereof is omitted herein.

Reference numeral 33 denotes a print processor having a capability of changing a print layout and performing a special process on an image to be printed. Reference numeral 34 denotes a graphics driver that processes the image to be printed according to a draw command received from the GDI 31 and produces a print control command. Reference numeral 35 denotes a UI (User Interface) module that provides and controls a user interface for the printer driver. Reference numeral 36 denotes a language monitor that functions as a data communication interface adapted to control transmission/reception of data.

Reference numeral 37 denotes a port monitor that transfers data received from the language monitor 36 to a proper port and receives data transmitted from the printer 3 via a class driver 38. The class driver 38 is a low-level module closest to a port.

In the present embodiment of the invention, the printer driver corresponds to a driver of a printer class of a WSD protocol or an IHV protocol, and controls the port (network port in the present embodiment). In the present example, it is assumed that the printer driver 50 is one available from ABC company that is a manufacturer of the printer 3.

FIG. 6 is a diagram illustrating a location setting dialog 46 that allows a user to set the location of a PC. Second property information indicating the setup location of the PC 1 is set according to the setting information input via the location setting dialog 46 shown in FIG. 6. A user defines the setup location of the PC 1 (information indicating the defined setup location is referred to as second property information) using the location setting dialog 46 shown in FIG. 6. More specifically, the user selects a location from "Home", "Office", and "Public" using the location setting dialog 46 thereby to define the network environment in which the PC 1 is used.

Reference numeral 47 denotes a "Home" selection button. If this button is pressed, the location of the PC 1 is set to "Home" and setup is performed so as to provide the PC 1 with an optimized home network environment.

Reference numeral 48 denotes an "Office" selection button. If this button is pressed, the location of the PC 1 is set to "Office" and setup is performed so as to provide the PC 1 with an optimized office network environment.

Reference numeral 49 denotes a Public selection button. If this button is pressed, the location of the PC 1 is set to "Public" and setup is performed so as to provide the PC 1 with a network environment optimized for use at a public place such as an air port, a cafe, etc.

Reference numeral 77 denotes an "Unspecified" selection button. If this button is pressed, the location of the PC 1 is set to be unspecified, and setup is performed so as to provide the PC 1 with a network environment optimized for use at an arbitrary location.

Figure 7:
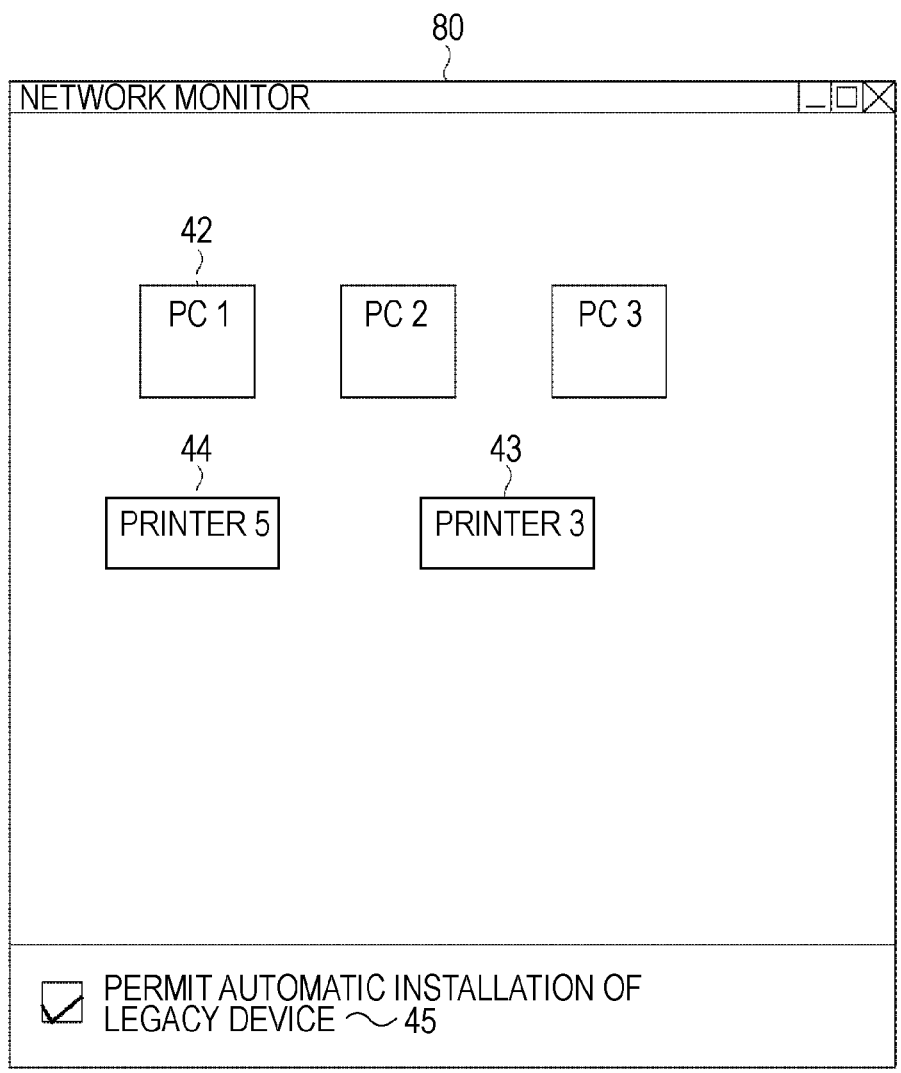
FIG. 7 is a diagram illustrating a network monitor.

FIG. 7 is a diagram illustrating a network monitor 80. As shown in FIG. 7, PCs and peripheral apparatuses located on the network 4 are displayed on the network monitor 80. The network monitor 80 is provided as a standard part of the OS.

In FIG. 7, reference numeral 42 denotes an icon representing the PC 1. Reference numeral 43 denotes an icon representing the printer 3. Reference numeral 44 denotes an icon representing the printer 5.

Reference numeral 45 denotes a check box for selecting whether to permit automatic installation of a legacy device. When the check box 45 is checked, the network monitor 80 permits automatic installation of a legacy device. However, if this check box 45 is not checked, automatic installation of the legacy device is not permitted. Note that the legacy device refers to a conventional peripheral apparatus, such as the printer 5, which does not have the functions according to the present embodiment of the invention. Also note that when there are peripheral apparatuses displayed on the network monitor 80, drivers therefor have not necessarily installed, and peripheral apparatuses are not necessarily in a usable state.

Figure 8:
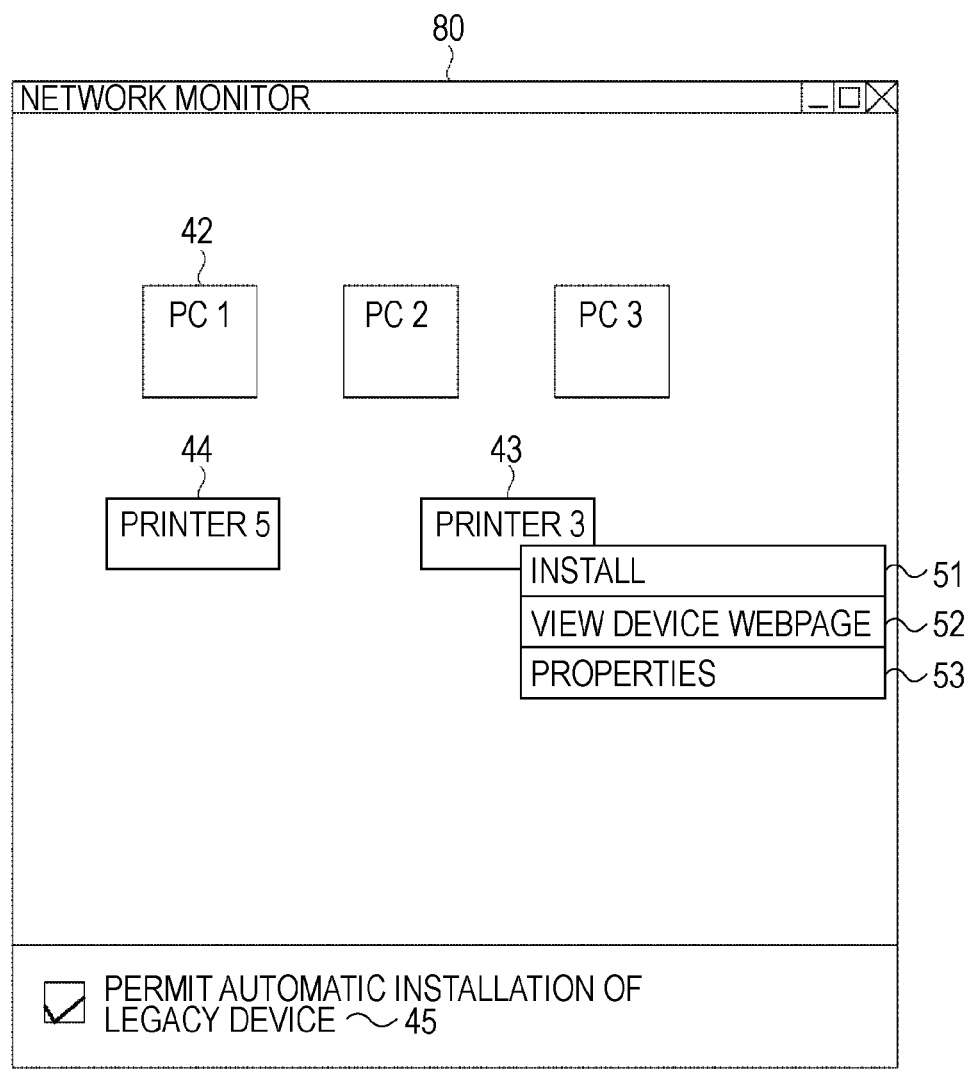
FIG. 8 is a diagram illustrating a network monitor.

FIG. 8 is a diagram illustrating the network monitor 80 in another state. In this figure, if a user manually selects the icon 43 representing the printer 3 by using a mouse and right-clicks the icon 43, then menus 51, 52, and 53 are displayed.

If the install menu 51 is selected, the printer driver 50 for the printer 3 is installed in the PC 1. If the installation of the printer driver 50 is completed, the install menu 51 is deleted and the uninstall menu 79 is displayed as described below with reference to FIG. 20. A printer icon 94 is then displayed in a printer folder 93 described below with reference to FIG. 21 to indicate that the printer 3 is usable for printing.

Reference numeral 52 denotes a Web page link menu. If this menu is selected, a Web page (a Web page of the printer 3 in this specific example) at a URL (http://www.ABC.xxx/kmmn.htm) specified by <wsdp:ModelUrl> in FIG. 9 is displayed. Reference numeral 53 denotes a property display menu. If this menu is selected, a URL (http://192.168.0.100:8000) specified by <wsdp:PresentationUrl> in FIG. 9 is accessed and a root page of a Web server in the printer 3 is displayed.

Figure 21:
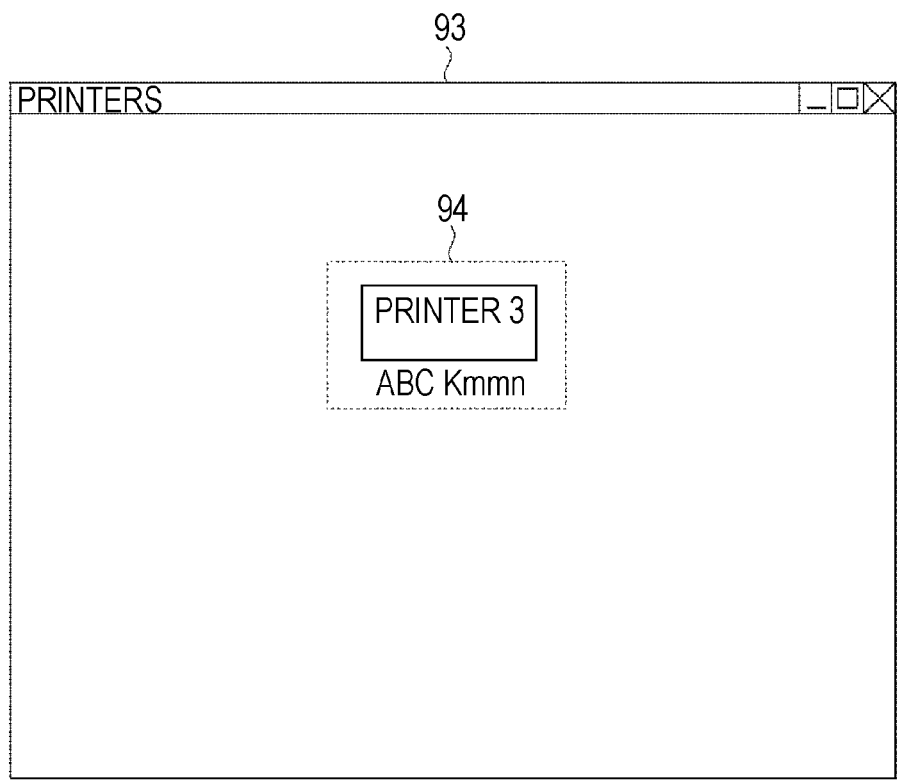
FIG. 21 is a diagram illustrating a printer folder.

FIG. 21 is a diagram illustrating a printer folder. In this figure, reference numeral 93 denotes a printer folder displayed on the PC 1. In this folder, printers usable by the PC 1 are displayed. In the specific example shown in FIG. 21, the printer 3 is displayed in the printer folder to indicate that the printer is 3 is in a usable state.

Figure 20:
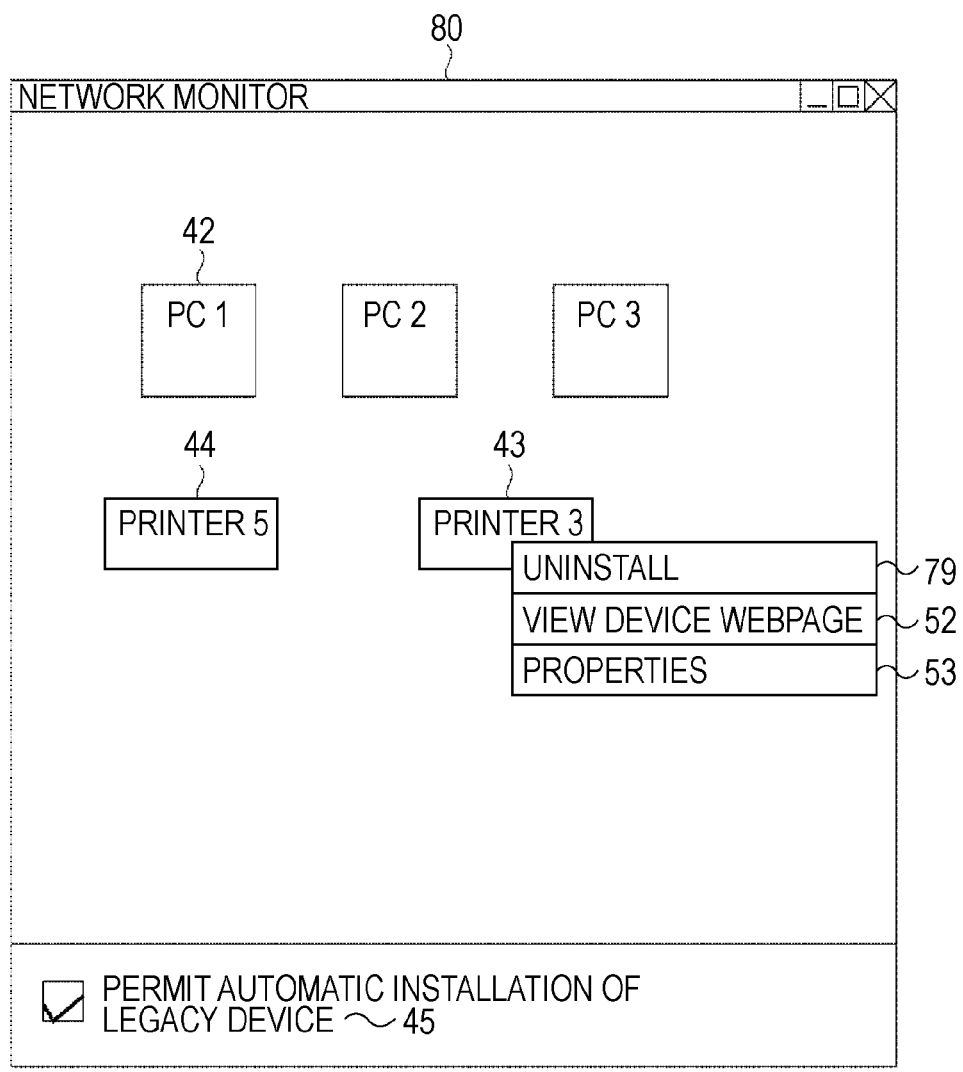
FIG. 20 is a diagram illustrating a network monitor.

FIG. 20 is a diagram illustrating a network monitor 80. In this figure, if a user manually selects an icon 43 representing the printer 3 and right-clicks the icon 43, then menus 79, 52, and 53 are displayed. The menus 52 and 53 are the same as those shown in FIG. 8. Reference numeral 79 denotes a uninstall menu. If this menu is selected, the printer driver 50 for the printer 3 is uninstalled from the PC 1. If the uninstallation of the printer 3 is completed, the uninstall menu 79 is deleted and the install menu 51 is displayed. Furthermore, the printer icon 94 is deleted from the printer folder 93 so that it is no longer displayed therein.

Figure 16:
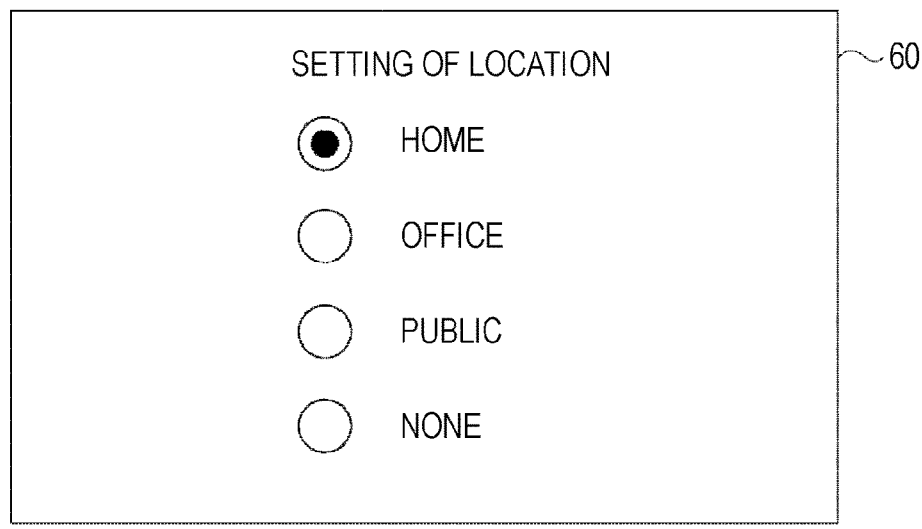
FIG. 16 is a diagram illustrating a screen for setting the location of a peripheral device.

FIG. 16 is a diagram illustrating a screen for setting the location of a peripheral apparatus. Using this location setting screen, a user is allowed to set first property information indicating the setup location of the peripheral apparatus. In FIG. 16, reference numeral 60 denotes a location setting screen that is displayed on the display 21 of the printer 3 and that allows a user to select a location of the peripheral apparatus (also referred to as a usage environment or a setup location of the peripheral apparatus) from the followings:

"Home" for home peripheral apparatuses;
"Office" for office peripheral apparatuses;
"Public" for peripheral apparatuses used at public locations; and
"None" for peripheral apparatuses used at unspecified locations.

Note that the property associated with the location of the peripheral apparatus may be set as default in advance when the peripheral apparatus is shipped.

In the example shown in FIG. 16, the first property information is set so as to specify "Home".

FIG. 25 is a diagram illustrating information associated with WS-Discovery. If the printer 3 is connected to the network 4 and is turned on, information shown in FIG. 25 is transmitted from the printer 3 to PCs and peripheral apparatuses located on the network.

FIG. 9 is a diagram illustrating N-PnP information issued by a printer. In this figure, reference numeral 78 denotes an N-PnP name space in which various parameters of N-PnP are defined. Reference numeral 107 denotes metadata elements of SOAP including detailed information associated with the peripheral apparatus (printer 3). Reference numeral 72 denotes an N-PnP device category data element indicating a category of the peripheral apparatus. Character strings used herein to define the device category include Computers, Cameras, Printers, Scanners, Storage, FAX, MFP, Displays, Gaming, and Phones. In the example shown in FIG. 9, the device category data element 72 indicates that the device category of the peripheral apparatus is "Printers".

Reference numeral 73 denotes a data element described to define an N-PnP location, i.e., a location of the peripheral apparatus. The following character strings are allowed to be used to specify the N-PnP location.

"Home" for home peripheral apparatuses;
"Office" for office peripheral apparatuses;
"Public" for peripheral apparatuses used at public locations; and
"None" for peripheral apparatuses used at unspecified locations.

In the example shown in FIG. 9, the data element 73 indicates that the location the peripheral apparatus is "Home". Reference numeral 74 denotes a data element indicating a URL of a Web site accessible to download IHV software. In this data element 74, any URL data is described to indicate the URL. In the example shown in FIG. 9, URL data is described in the data element 74 so as to indicate a Web site where software provided by ABC company is placed. The IHV software URL is optional, and no information may be described in the data element 74. N-PnP information such as that shown in FIG. 9 is issued from the printer 3 to PCs or peripheral apparatuses located on the network 4.

FIGS. 10A and 10B are tables indicating relationships among PC locations, network discovery functions, and modes of installing a peripheral apparatus. These tables are standard modules of the OS. In these tables, as shown in FIGS. 10A and 10B, the network discovery mode (in which to search for the network) and the device installation mode (in which to install the peripheral apparatus) are defined for each PC location selected in FIG. 6. In the network discovery column, "On" indicates that the network discovery function is enabled. When the network discovery function is on, the PC 1 searches for PCs and peripheral apparatuses location on the network 4 and displays detected PCs and peripheral apparatuses on the network monitor 80 or the IHV network monitor 81.

In the network discovery column, "Off" indicates that the network discovery function is disabled. When the network discovery function is off, the PC 1 does not search for PCs and peripheral apparatuses location on the network 4 and thus PCs and peripheral apparatuses are not displayed on the network monitor 80 or the IHV network monitor 81.

In the device installation column, "Automatic" indicates that automatic installation of a printer driver or the like is permitted. In this case, when a peripheral apparatus is connected to the network 4 and the power thereof is turned on, the PC 1 is allowed to automatically install a driver of the peripheral apparatus.

In the device installation column, "Manual" indicates that a printer driver or the like is manually installed in accordance with an install command issued by a user. In this case, when a peripheral apparatus such as the printer 3 is connected to the network 4 and the power thereof is turned on, the PC 1 displays an install menu 51 shown in FIG. 8 or an install menu 103 shown in FIG. 22. If a user manually inputs an install command, installation is performed.

In the device installation column, "Unavailable" indicates that installation of a peripheral apparatus driver is disabled. In this case, when a peripheral apparatus is connected to the network 4 and power thereof is turned on, the PC 1 controls operation so that a driver of the peripheral apparatus is not installed. Note that the table shown in FIG. 10A is applied when a firewall function of the OS is on, while the table shown in FIG. 10B is applied when the firewall function is off.

FIG. 11 illustrates a table that defines modes of controlling displaying information on the network monitor 80 and modes of installing peripheral apparatuses. This table is one of modules of the network monitor 80 and is provided as a standard part of the OS.

Note that the table shown in FIG. 11 is applied when the firewall function of the OS is off as is the case in FIG. 10B.

In FIG. 11, in a "PC Location" column, the location (setup location) of the PC set in FIG. 6 is described, and "npnp: Location" is a column in which the N-PnP location data element 73 is described. "Network Monitor" is a column in which information is described as to the mode of controlling information on the network monitor 80 shown in FIG. 7. Note that the N-PnP location data element 73 indicates the setup location of the peripheral apparatus. In FIG. 11, in an "Install" column, information is described as to the mode of installation the peripheral apparatus, and in an "npnp:DeviceCategory" column, the N-PnP device category data element 72 is placed. "Remark" is a remark column.

In the "Network Monitor" column indicating the mode of controlling displaying information on the network monitor 80, "Displayed" specifies that displaying is controlled such that peripheral apparatuses are displayed on the network monitor 80, while "Not displayed" specifies that peripheral apparatuses are not displayed on the network monitor 80. For example, in a case where the location of the PC 1 is set to "Home", and the N-PnP information issued by the printer 3 indicates that the location of the printer 3 is set to "Public", then, according to the table shown in FIG. 11, the PC 1 does not display an icon of the printer 3 on the network monitor 80.

In the "Install" column indicating the peripheral apparatus installation mode, "Auto" specifies that the installation is performed in the automatic installation mode, while "Manual" specifies that the installation is performed in the manual installation mode. For example, in a case where the location of the PC 1 is set to "Office", and the N-PnP information issued by the printer 3 indicates that the location of the printer 3 is set to "Home", then, according to the table shown in FIG. 11, the installation of the driver of the printer 3 is performed in the manual installation mode. In this case, in accordance with an install command issued by a user, an installation process is performed to install the device driver.

The N-PnP device category data element (in the "npnp: DeviceCategory" column) is information indicating the category (type) of the N-PnP device (peripheral apparatus). In this column, "Printers/Scanners/MFP" indicates that the category (type) of the peripheral apparatus is "Printers", "Scanners", or "MFP". "Others" indicates that the category of the peripheral apparatus is other than "Printers/Scanners/MFP". Any indicates that the category of the peripheral apparatus can be any one.

In the "Remark" column, scenarios are described in terms of modes of controlling displaying information on the network monitor 80 and modes of installing device drivers.

According to the table shown in FIG. 11, the PC 1 determines an optimum displaying mode and an optimum installation mode depending on the location of the PC 1, the location of the N-PnP device, and the N-PnP device category. If the automatic installation is simply applied to any peripheral apparatus, a problem with security can occur as described below. For example, when a peripheral apparatus connected to a network is an apparatus used by an individual, such as a portable telephone device or a digital camera, if the automatic installation is applied to this peripheral apparatus, then there is a possibility that the peripheral apparatus is displayed as a target apparatus to which data is transmitted from the PC even when the peripheral apparatus does not have any relationship with the PC. In the present embodiment, to avoid the above-described problem with security, the automatic installation is permitted only when the category of a peripheral apparatus of interest is "Printers", "Scanners", or "MFP", but the automatic installation is not permitted for any other category.

In a case where the location of the PC is unspecified, and the N-PnP location data element 73 is set to "Home", that is, the peripheral apparatus is an apparatus for use at home, high priority is given to this information received from the peripheral apparatus, and the automatic installation is performed. This allows a user to easily perform correct installation according to the N-PnP device information indicating that the specified usage environment is "Home", even in a case where the location of the PC is not specified by the user.

In a case where the location of the PC is set to "Office" or "Public", the automatic installation is not permitted even when the N-PnP location information 73 is set to "Home", i.e., the peripheral apparatus is an apparatus for use at home, in order to achieve high security. That is, when the location of the PC is set by a user to "Office" or "Public", high priority is given to this information indicating that the location of the PC is "Office" of "Public", and security is ensured by disabling the automatic installation even for a home-use peripheral apparatus.

In the present embodiment, as described above, the automatic installation is permitted in the home network environment thereby making it easy to perform setup for peripheral apparatuses. On the other hand, in the office network environment, the installation is performed manually. Thus, it is possible to achieve both high security and easy installation.

FIG. 12 is a flow chart illustrating an example of a process of setting up a peripheral apparatus. In this figure, a process performed by a PC is controlled by the network monitor 80 and the OS via the software shown in FIG. 4. A process performed by the network monitor 80 is controlled via the application/DDI interface 84.

In FIG. 12, if the printer 3 is connected to the network 4 and the power of the printer 3 is turned on, the printer 3 issues N-PnP information such as that shown in FIG. 9 and WS-Discovery information such as that shown in FIG. 25 (step S1202).

The PC 1 analyzes the N-PnP device category data element 72, the N-PnP location data element 73, and the IHV software URL data element 74, described in the metadata of the N-PnP information (step S1203). The PC 1 checks the table shown in FIG. 11 (step S1204), and determines whether to display the printer 3 on the network monitor 80 in accordance with the information acquired in step S1203 and the table shown in FIG. 11 (step S1205). More specifically, the PC 1 performs the determination based on the location information (the second property information) of the PC 1 and the location information (the first property information) of the printer 3 acquired in step S1203.

The PC 1 can recognize the location of the PC 1 itself. For example, when the location of the PC 1 is set to "Home" and the location information 73 associated with the printer 3 acquired in step S1203 indicates that the location of the printer 3 is set to "Home", the PC 1 determines that the icon of the printer 3 should be displayed on the network monitor 80.

In a case where the determination in step S1205 is that the icon of the printer 3 should be displayed, the PC 1 displays the icon of the printer 3 on the network monitor 80 (step S1206). Furthermore, based on the information acquired in step S1203 and the table shown in FIG. 11, the PC 1 determines the installation mode (step S1207). For example, when the location of the PC 1 is set to "Home" and the location data element 73 associated with the printer 3 acquired in step S1203 indicates that the location of the printer 3 is set to "Office", the PC 1 determines that the printer driver of the printer 3 should be installed in the manual mode. That is, the PC 1 determines that the automatic installation mode is not employed.

In a case where it is determined in step S1207 that the automatic installation mode is employed, the PC 1 starts the installation of the printer driver 50 of the printer 3 in the automatic installation mode (step S1211). In a case where a URL is described in the IHV software URL data element 74 (that is, if the answer to step S1212 is Yes), the PC 1 downloads an IHV printer driver from a Web site identified by the URL. That is, the URL data element 74 is storage location information indicating the location at which the printer driver is stored. The PC 1 then installs the downloaded printer driver 50 (step S1213). This allows the PC 1 to update the printer driver 50 of the printer 3 to a latest version thereof. If the installation is completed, the setup is completed.

In a case where it is determined in step S1212 that no URL is defined in the IHV software URL data element 74 or there is no IHV software URL data element 74, the PC 1 installs the printer driver 50 from "DriverStore" in the OS (step S1214).

In a case where it is determined in step S1205 that the printer 3 should not be displayed on the network monitor 80, the PC 1 disables the installation of the printer driver 50 (step S1215), and the PC 1 ends the process.

In a case where it is determined in step S1207 that the automatic installation mode is not permitted, the PC 1 determines whether the manual installation mode is specified for the peripheral apparatus (step S1208).

If it is determined that the manual installation mode is specified, the PC 1 displays the printer 3 on the network monitor 80 (step S1209). If a user selects the install menu 51 (step S1210), the PC 1 determines a determination process in step S1212. If it is determined in step S1210 that the install menu 51 is not selected, step S1210 is performed repeatedly until the install menu 51 is selected. In a case where it is determined in step S1208 that the manual installation mode is not specified for the peripheral apparatus, the PC 1 disables the installation of the printer driver 50.

As described above, by performing the process shown in FIG. 12, the PC 1 can select the printer driver installation mode based on the location information (the second property information) of the PC 1 and the location information (the first property information) of the peripheral apparatus.

One of advantages provided by the present embodiment of the invention is that it becomes possible to easily set up a network-connected peripheral apparatus in a home network environment, and thus the operability is improved. Besides, in an office network environment, setup of a network-connected peripheral apparatus can be performed in a manner that ensures high security.

Figure 13:
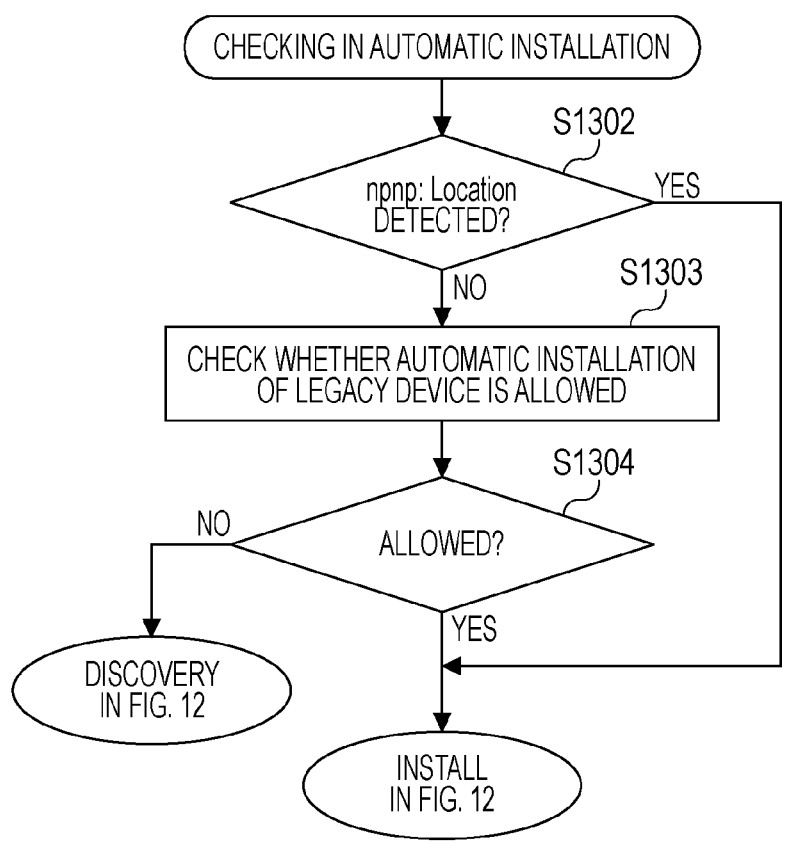
FIG. 13 is a flow chart illustrating a checking process in an automatic installation.

FIG. 13 is a flow chart illustrating a checking process in an automatic installation process. The process shown in this figure is controlled by the network monitor 80 and the OS via the software shown in FIG. 4. A process performed by the network monitor 80 is controlled via the application/DDI interface 84.

When the automatic installation is started in step S1211 in FIG. 12, the checking process shown in FIG. 13 may be performed. In this case, when the checking associated with the automatic installation is started, the PC 1 determines whether the information acquired in step S1203 in FIG. 12 includes the N-PnP location data element 73 (step S1302). If no N-PnP location data element 73 is detected (that is, if the answer to step S1302 is No), the PC 1 determines the status of the check box 45 to determine whether the automatic installation of a legacy device is permitted (step S1303). If it is determined that this check box 45 is checked (that is, if the answer to step S1304 is Yes), the PC 1 performs the automatic installation of the legacy device, i.e., a conventional peripheral apparatus that does not have the function according to the present embodiment of the invention (step S1212).

On the other hand, in a case where it is determined in step S1304 that the check box 45 is not checked, the PC 1 advances the process to step S1209 in FIG. 12 without performing the automatic installation process, and displays the printer 3 on the network monitor 80. In a case where it is determined in step S1302 that N-PnP location data element 73 is detected, it is determined that the peripheral apparatus of interest is of the type having the function according to the present embodiment of the invention, and thus process proceeds to step S1212 in FIG. 12 to perform the automatic installation process.

The checking process shown in FIG. 13 makes it possible to prevent the automatic installation from being performed for a legacy apparatus whose location information is not defined. That is, it becomes possible to prevent a device driver from being installed for a device whose location information is undefined.

An example of a potential problem is described below. For example, for a PC installed in an office, if a user sets the location information to "Home" by mistake, and if there is a legacy printer located in this office environment, the PC 1 automatically installs a driver of this legacy printer. As a result of the automatic installation of the driver for the device whose location information is undefined, the administrator of the office cannot manage the device. Such a potential problem can be prevented by performing the checking according to the flow shown in FIG. 13.

Second Exemplary Embodiment

A second exemplary embodiment of the present invention is described with reference to FIG. 14, FIG. 15, FIGS. 17 to 19, and FIGS. 22 to 24. In the following description, the explanation is focused on differences from the first embodiment.

Figure 22:
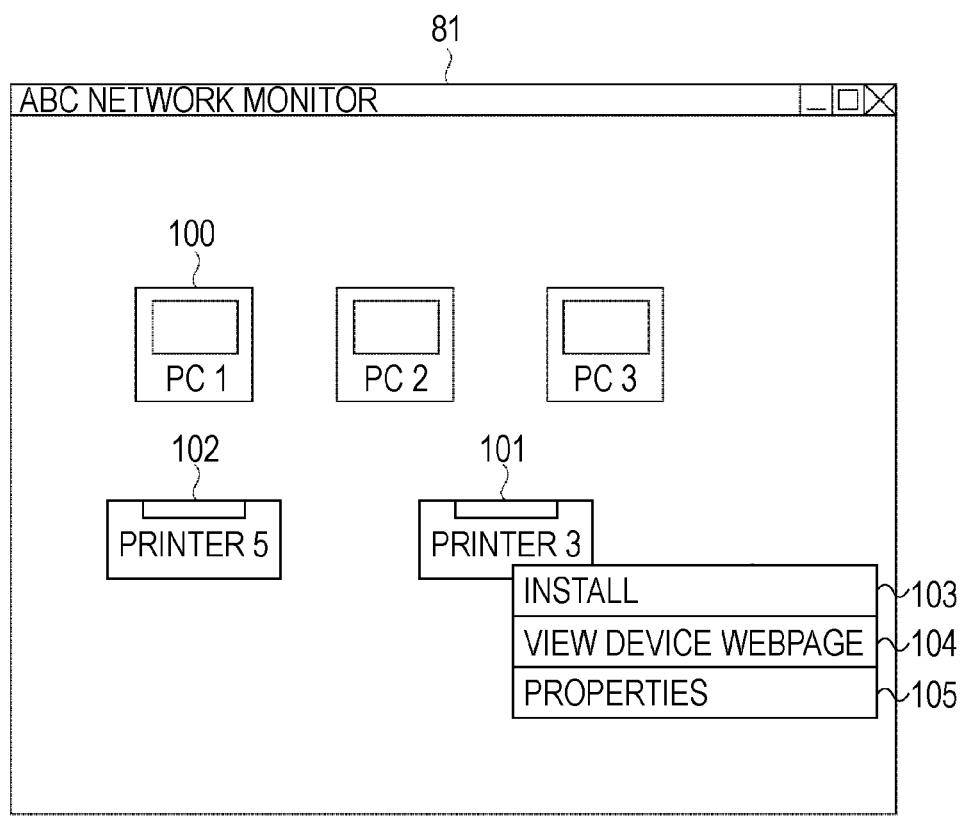
FIG. 22 is a diagram illustrating an IHV network monitor.

FIG. 22 is a diagram illustrating an IHV network monitor 81. As shown in FIG. 22, PCs and peripheral apparatuses located on the network 4 are displayed on the IHV network monitor 81. Note that the IHV network monitor 81 is provided by an IHV (Independent Hardware Vendor) and is not included as standard in the OS. Therefore, it is necessary to install the IHV network monitor 81 from the outside. In the following explanation, it is assumed by way of example that the IHV network monitor 81 is a network monitor provided by ABC company.

In FIG. 22, reference numeral 100 denotes an icon representing the PC 1. Reference numeral 101 denotes an icon representing the printer 3. Reference numeral 102 denotes an icon representing the printer 5. Note that when there are peripheral apparatuses displayed on the IHV network monitor 81, drivers therefor have not necessarily installed, and peripheral apparatuses are not necessarily in a usable state.

In FIG. 22, if a user manually selects the icon 101 representing the printer 3 using a mouse and right-clicks the icon 101, then menus 103, 104, and 105 are displayed. The menu 103 is an install menu. If this menu is selected, the printer driver 50 for the printer 3 is installed in the PC 1. If the installation process is completed, the install menu 103 is deleted and an uninstall menu 106 is displayed as described below with reference to FIG. 23. A printer icon 94 is then displayed in a printer folder 93 shown in FIG. 21 to indicate that the printer 3 is usable for printing.

The menu 104 is a Web page link menu. If this menu is selected, a Web page of a URL (http://www.ABC.xxx/kmmn.htm) specified in <wsdp:ModelUrl> in FIG. 9 is displayed.

The menu 105 is a property display menu. If this menu is selected, a URL (http://192.168.0.100:8000) specified in <wsdp:PresentationUrl> in FIG. 9 is accessed and a root page of a Web server in the printer 3 is displayed.

The IHV network monitor 81 is different from the network monitor 80 (shown in FIG. 7) provided as a standard module of the OS in that icons of PCs and icons of printers are displayed in different manners. Furthermore, unlike the network monitor 80 having the check box 45 specifying whether to permit automatic installation of a legacy device, the IHV network monitor 81 does not have an operation mechanism similar to the check box 45.

Figure 23:
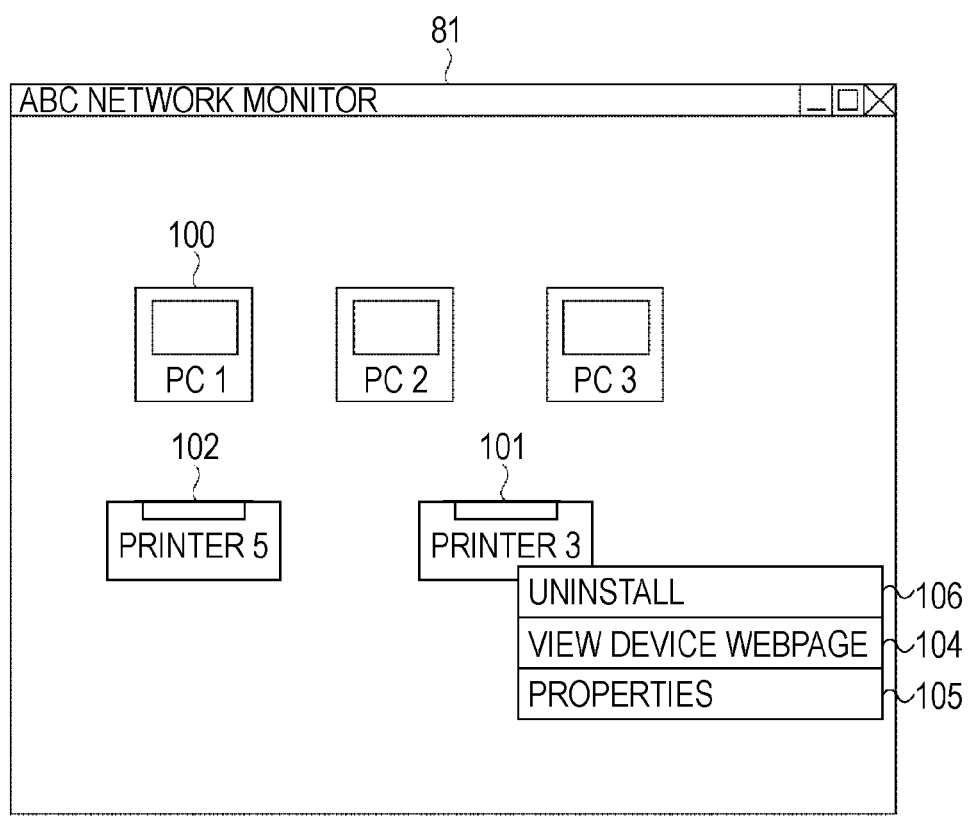
FIG. 23 is a diagram illustrating an IHV network monitor.

FIG. 23 is a diagram illustrating an example of the IHV network monitor 81. In this figure, if a user manually selects an icon 101 representing the printer 3 using a mouse and right-clicks the icon 101, then menus 106, 104, and 105 are displayed. The menus 104 and 105 are the same as those shown in FIG. 22. The menu 106 is a uninstall menu. If this menu is selected, the printer driver 50 for the printer 3 is uninstalled from the PC 1. If the uninstallation of the printer 3 is completed, the uninstall menu 106 is deleted and the install menu 103 is displayed. The printer icon 94 is deleted from the printer folder 93 so that it is no longer displayed therein.

Figure 17:
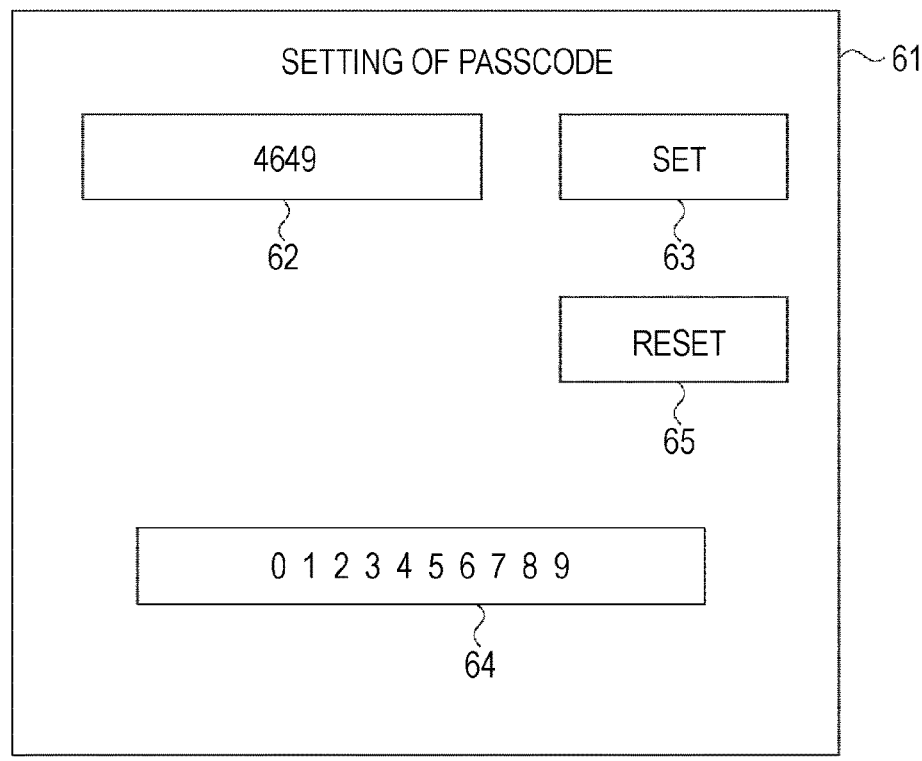
FIG. 17 is a diagram illustrating a screen for setting a passcode of a peripheral device.

FIG. 17 is a diagram illustrating a screen for setting a passcode of a peripheral apparatus. In this figure, reference numeral 61 denotes a passcode setting screen that is displayed on the display 21 of the printer 3 so as to allow a user to set a passcode. Note that the passcode refers to information serving as a password of an apparatus. Hereinafter, the passcode of a peripheral apparatus will also be referred to as identification information.

Reference numeral 62 denotes a passcode (identification information) input field that allows a user to input a passcode including a combination of 4 to 10 digits of numeric characters 0 to 9 thereby to specify the passcode. When the passcode setting screen 61 is displayed, a current passcode is displayed as an initial value. Reference numeral 64 denotes a numeric value selection field from which a user is allowed to select a numeric value to be input in the passcode input field 62. Reference numeral 63 denotes a passcode setting button. If this button is pressed, the value input in the passcode input field 62 is set as the passcode.

When the passcode setting button 63 is pressed, a previously specified passcode is overwritten by the passcode specified in the passcode input field 62, and thus the passcode is changed to the newly specified value. Reference numeral 65 denotes a passcode reset button. If this button is pressed, the passcode input in the passcode input field 62 is discarded and the passcode specified previously is again displayed.

FIG. 18 is a diagram illustrating passcode information issued by a PC. In this figure, reference numeral 96 denotes a name space of a passcode. More specifically, a passcode of ABC company is defined in this name space 96. Reference numeral 97 denotes a SOAP "Action" data element. Information described in this data element indicates a transmission action for the passcode.

Reference numeral 75 denotes a passcode data element. In this data element 75, information specified by an application such as the IHV network monitor 81 on the PC 1 is described. The passcode information shown in FIG. 18 is issued by the application such as the IHV network monitor 81 running on the PC 1 and transmitted from the PC 1 to the printer 3 via the network 4.

FIG. 19 is a diagram illustrating passcode confirmation information issued by a printer. In FIG. 19, reference numeral 98 denotes a SOAP "Action" data element describing a SOAP action. In this specific case, information described in this data element 98 indicates a response action on the passcode confirmation result. Reference numeral 76 denotes a passcode confirmation result data element in which information is described to indicate a result of a comparison between the passcode specified in the passcode data field 75 and a passcode set in the printer 3. In this data element 76, it is allowed to describe information (a character string) selected from the followings: "Valid" and "Invalid".

FIG. 24 is a table used to determine a mode of controlling displaying information on the IHV network monitor 81 and a mode of installing a peripheral apparatus. This table is one of modules of the IHV network monitor 81. This table is provided by an IHV and is not included as standard in the OS. Therefore, it is necessary to install the table from the outside. In the present embodiment, it is assumed by way of example that the table is a module provided from ABC company.

The table shown in FIG. 24 is for a case where the firewall function of the OS is off as is the case in FIG. 10B. In FIG. 24, a "PC Location" column describes the location of the PC selected in FIG. 6. An "npnp:Location" column describes the N-PnP location data element 73. An "IHV Network Monitor" column describes information specifying the mode of controlling displaying information on the IHV network monitor 81 shown in FIG. 22. An "Install" column describes the mode of installing a peripheral apparatus. An "npnp:DeviceCategory" column describes the N-PnP device category data element 72. "Remark" is a remark column.

In the "IHV Network Monitor" column indicating the mode of controlling displaying information on the network monitor 81, "Displayed" specifies that displaying is controlled such that peripheral apparatuses are displayed on the IHV network monitor 81, while "Not displayed" indicates that peripheral apparatuses are not displayed on the IHV network monitor 81. In the "Install" column indicating the peripheral apparatus installation mode, "Auto" specifies that the peripheral apparatus is automatically installed, and "Manual" specifies that the peripheral apparatus is manually installed in accordance with an install command issued by a user.

In the N-PnP device category data element 72 (npnp:DeviceCategory), "Printers/Scanners/MFP" indicates that the category of the peripheral apparatus is "Printers", "Scanners", or "MFP". "Others" indicates that the category of the peripheral apparatus is other than "Printers/Scanners/MFP". Any indicates that the category of the peripheral apparatus can be any one.

In the "Remark" column, scenarios are described in terms of modes of controlling displaying information on the IHV network monitor 81 and modes of installing device drivers.

According to the table shown in FIG. 24, the IHV network monitor 81 determines an optimum displaying mode and an optimum installation mode according to the location of the PC, the N-PnP location data element, and the N-PnP device category data element. If the automatic installation is simply applied to any peripheral apparatus, a problem with security can occur as described above in the first embodiment. In the present embodiment, to avoid the problem with security, the automatic installation is permitted only when the category of a peripheral apparatus of interest is "Printers", "Scanners", or "MFP", but the automatic installation is not permitted for any other category.

In a case where the location of the PC is unspecified, and the N-PnP location data element 73 is set to "Home", that is, the peripheral apparatus is an apparatus for use at home, high priority is given to this information received from the peripheral apparatus, and the automatic installation is permitted.

The table shown in FIG. 24 is different from that shown in FIG. 11 in that when the location of a PC is defined as "Office" and the N-PnP location data element 73 is set to "Home", high priority is given to information ("Home") received from a peripheral apparatus and the automatic installation is permitted.

In a case where the location of the PC is defined as "Public" and the N-PnP location data element 73 is set to "Home", high priority is given to information received from a peripheral apparatus and installation is performed in the manual mode. The reason that information received from a peripheral apparatus is given high priority when the location of a PC is defined as "Public" is to realize specifications defined by ABC company so as to achieve high security. Besides, an improvement in user operability is achieved by giving high priority to information described in the N-PnP location data element 73 received from a peripheral apparatus, and selecting the automatic installation mode or the manual installation mode depending on an environment in which the peripheral apparatus is used. The specifications of the IHV network monitor 81 may be optimized to meet specific requirements of the IHV. This makes it possible to realize a network monitor different from the network monitor 80 that is a standard module of the OS. Such a special network monitor can lead to a further improvement in user operability.

FIG. 14 is a flow chart illustrating a process of setting up a peripheral apparatus according to the second embodiment of the present invention. In this figure, a process performed by the PC 1 is controlled by the IHV network monitor 81 and the OS via the software shown in FIG. 4. A process performed by the IHV network monitor 81 is controlled via the application/DDI interface 84.

In FIG. 14, when the printer 3 in a power-on state is connected to the network 4, the printer 3 issues N-PnP information such as that shown in FIG. 9 and WS-Discovery information such as that shown in FIG. 25 (step S1402).

The PC 1 analyzes the N-PnP device category data element 72, the N-PnP location data element 73, and the IHV software URL data element 74, described in the metadata of the N-PnP information (step S1403). The PC 1 then checks the table shown in FIG. 24 (step S1404).

Furthermore, based on the information acquired in step S1403 and the table shown in FIG. 24, the PC 1 determines whether the printer 3 should be displayed on the IHV network monitor 81 (step S1405). In a case where the determination in step S1405 is that the printer 3 should be displayed, the PC 1 displays the icon of the printer 3 on the IHV network monitor 81 (step S1406).

Furthermore, based on the table shown in FIG. 24 and the information acquired in step S1403, the PC 1 determines whether the automatic installation is specified as the installation mode.

Figure 15:
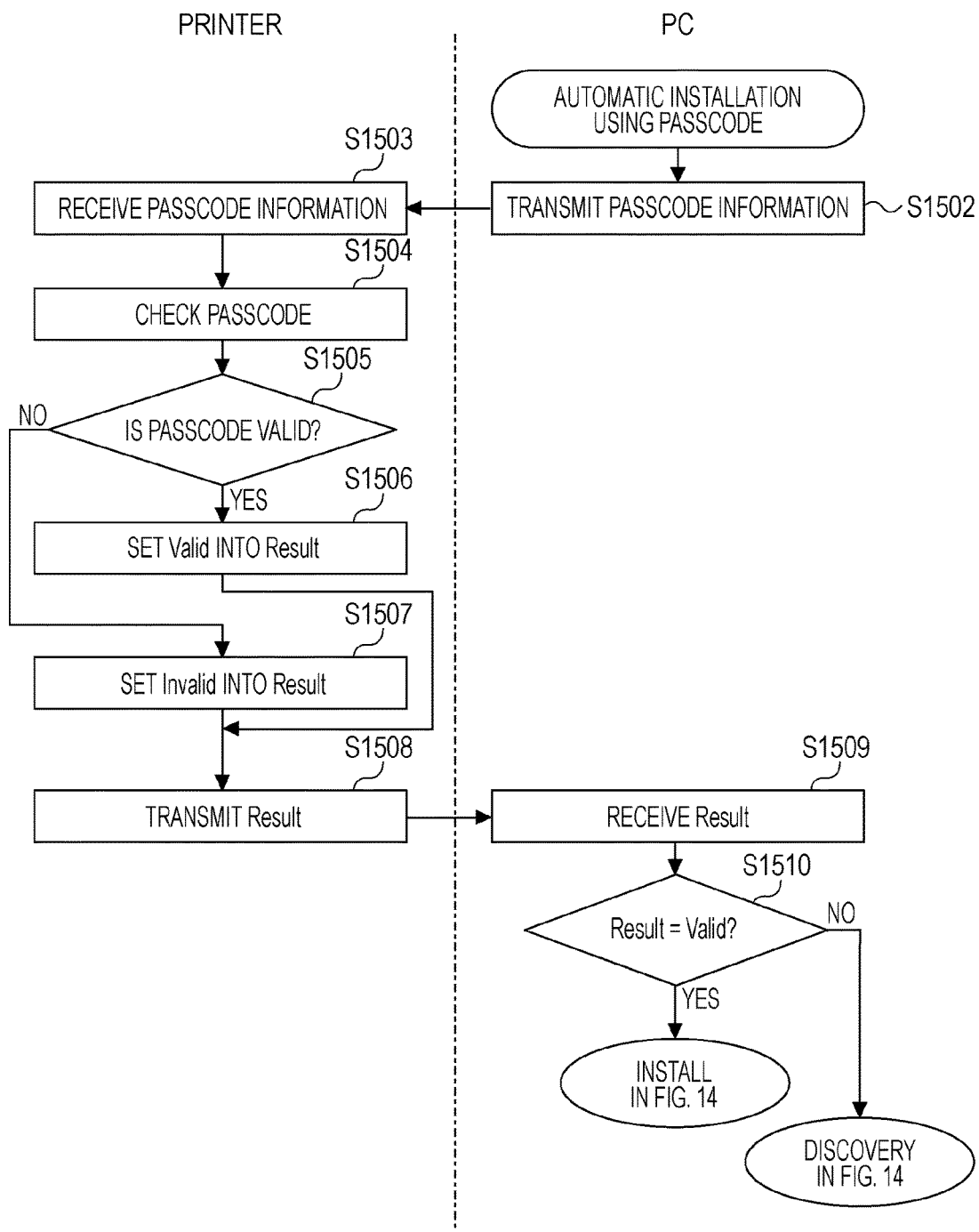
FIG. 15 is a flow chart illustrating an automatic installation process using a passcode.

If it is determined in step S1407 that the automatic installation mode is specified (that is, if the answer to step S1407 is Yes), then the PC 1 performs the automatic installation process to install the printer driver 50 of the printer 3 in the PC 1 according to a passcode described below with reference to FIG. 15 (step S1411).

In a case where a URL is described in the IHV software URL data element 74 (that is, if the answer to step S1412 is Yes), the PC 1 accesses the specified URL and downloads an IHV printer driver 50 from a Web site identified by the URL (step S1413). This allows the PC 1 to update the printer driver 50 of the printer 3 to a latest version thereof. If the installation is completed, the setup is completed.

In a case where it is determined in step S1412 that no URL is defined in the IHV software URL data element 74 or there is no IHV software URL data element 74, the PC 1 installs the printer driver 50 from "DriverStore" in the OS (step S1414). If the installation is completed, the setup is completed.

In a case where it is determined in step S1405 that the printer 3 is not displayed on the IHV network monitor 81, the PC 1 disables the installation of the printer driver 50 (step S1415), and the PC 1 ends the process. In a case where it is determined in step S1407 that the specified installation mode for the peripheral apparatus is not automatic installation, the PC 1 determines whether the manual installation mode is specified for the peripheral apparatus (step S1408). In a case where it is determined in step S1408 that the manual installation mode is specified, the PC 1 displays the printer 3 on the IHV network monitor 81 (step S1409). Thereafter, if a user selects the install menu 103 (that is, if the answer to step S1410 is Yes), the process proceeds to step S1412 to install the printer driver 50 of the printer 3 in the PC 1. If it is determined in step S1410 that the install menu 103 is not selected, step S1410 is performed repeatedly until the install menu 103 is selected.

In a case where it is determined in step S1408 that the manual installation is not specified as the mode of installing the peripheral apparatus, the PC 1 disables the installation of the printer driver 50. FIG. 15 is a flow chart illustrating an automatic installation process using a passcode. In this figure, a process performed by a PC is controlled by the IHV network monitor 81 and the OS via the software shown in FIG. 4. A process performed by the IHV network monitor 81 is controlled via the application/DDI interface 84. When the PC 1 starts the automatic installation process according to the passcode in step S1411 in FIG. 14, the PC 1 transmits passcode information such as that shown in FIG. 18 to the printer 3 (step S1502).

If the printer 3 receives this passcode information (step S1503), the printer 3 compares the received passcode with a passcode set in the printer 3 (step S1504). If it is determined that the passcode is valid (that is, if the answer to step S1505 is Yes), the printer 3 sets "Valid" in the passcode confirmation result data element 76 (step S1506), and transmits information such as that shown in FIG. 19 indicating the result of the confirmation of the passcode to the PC 1 (step S1508). On the other hand, in a case where it is determined in step S1505 that the passcode is invalid "Invalid" is set in the passcode confirmation result data element 76 (step S1507), and the printer 3 transmits information such as that shown in FIG. 19 indicating the result of the confirmation of the passcode to the PC 1. The PC 1 receives this information indicating the result of the passcode confirmation (step S1509). If the passcode confirmation result data element 76 indicates that the passcode is "Valid" (that is, the answer to step S1510 is Yes), the process proceeds to step S1412 shown in FIG. 14 to install the printer driver 50. On the other hand, if it is determined in step S1510 that the passcode confirmation result data element 76 indicates that the passcode is "Invalid", the process proceeds to step S1409 shown in FIG. 14 to display the printer 3 on the IHV network monitor 81.

By using a passcode in the above-described manner, it becomes possible to set up a peripheral apparatus in the automatic installation mode in a highly secure manner.

In the embodiment described above, the enabling/disabling of the automatic installation is controlled according to a single passcode. Alternatively, the automatic installation may be controlled in the following manner to achieve further improved security. That is, in the PC 1, different passcodes are assigned to login accounts of the OS. For example, a passcode 1 is assigned to an administrator login account, and a passcode 2 is assigned to other general user login accounts. In the printer 3, the passcode 1 and the passcode 2 are also set.

The automatic installation is permitted for the passcode 1, while the manual installation is permitted for the passcode 2. In an operation environment in which a user is logged in, using the administrator account, to the PC 1, if the IHV network monitor 81 is activated, then the passcode 1 is applied, and the automatic installation is permitted.

On the other hand, in an operation environment in which a user is logged in, using the general user account, to the PC 1, if the IHV network monitor 81 is activated, then the passcode 2 is applied, and the manual installation is permitted.

When the IHV network monitor 81 is activated in an operation environment in which a user is logged in using any other account (which is neither the administrator account nor the general user account), installation is not permitted in any mode.

By controlling the installation in the above-described manner, it becomes possible to prevent a driver from being installed by an unauthorized user.

Third Exemplary Embodiment

In the first and second embodiments described above, the installation mode is determined according to both the location information of the PC 1 and the location information of the peripheral apparatus. In a third exemplary embodiment, the installation mode is determined according to the location information of the PC 1, as described below with reference to FIG. 28. In the following description, the explanation is focused on differences from the first and second embodiments.

The PC 1 checks the location information (the first property information) set in FIG. 6 (step S2801). Note that the information set in FIG. 6 is stored in a storage unit such as the RAM 1201, and thus the checking of the location information is performed by reading the information stored in the RAM 1201.

The PC 1 determines whether the location information (the first property information) read in step S2801 indicates that "Home" (a first setup location) is specified as the location (step S2802).

If it is determined in step S2802 that "Home" is specified, then the PC 1 selects the automatic installation as the installation mode (step S2803). On the other hand, if it determined that the specified location is not "Home" (but a second setup location such as "Office" or "Public" is specified as the location), the PC 1 selects the manual installation as the installation mode (step S2804).

In the present embodiment, the installation mode can be selected without having to communicate with the peripheral apparatus via the network, and thus it is easier to determine the installation mode than in the other embodiments.

Fourth Exemplary Embodiment

In the first and second embodiments described above, the installation mode is determined according to the table shown in FIG. 11 or 24. In a fourth exemplary embodiment, as described below with reference to FIG. 29, the installation mode is determined without using a table.

Figure 28:
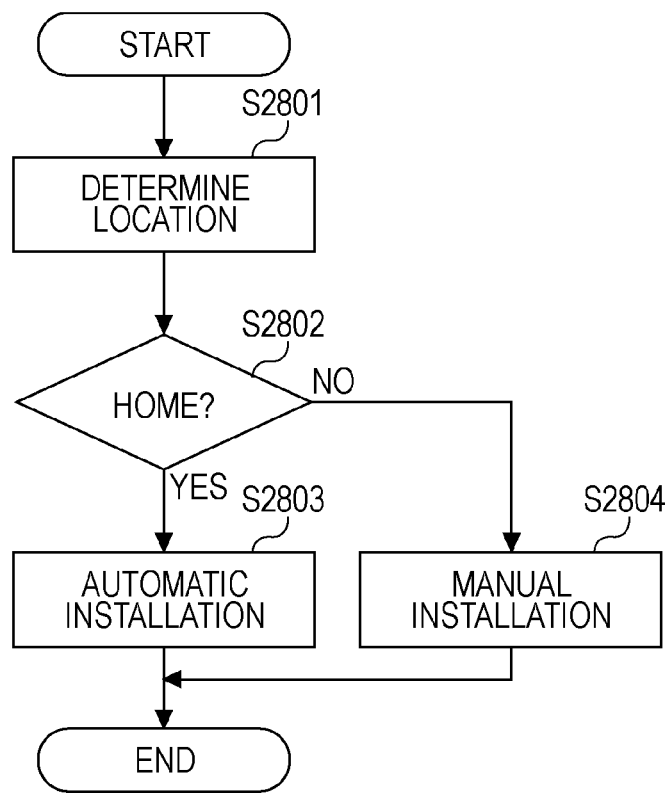
FIG. 28 is a flow chart illustrating a process of selecting an installation mode.
Figure 29:
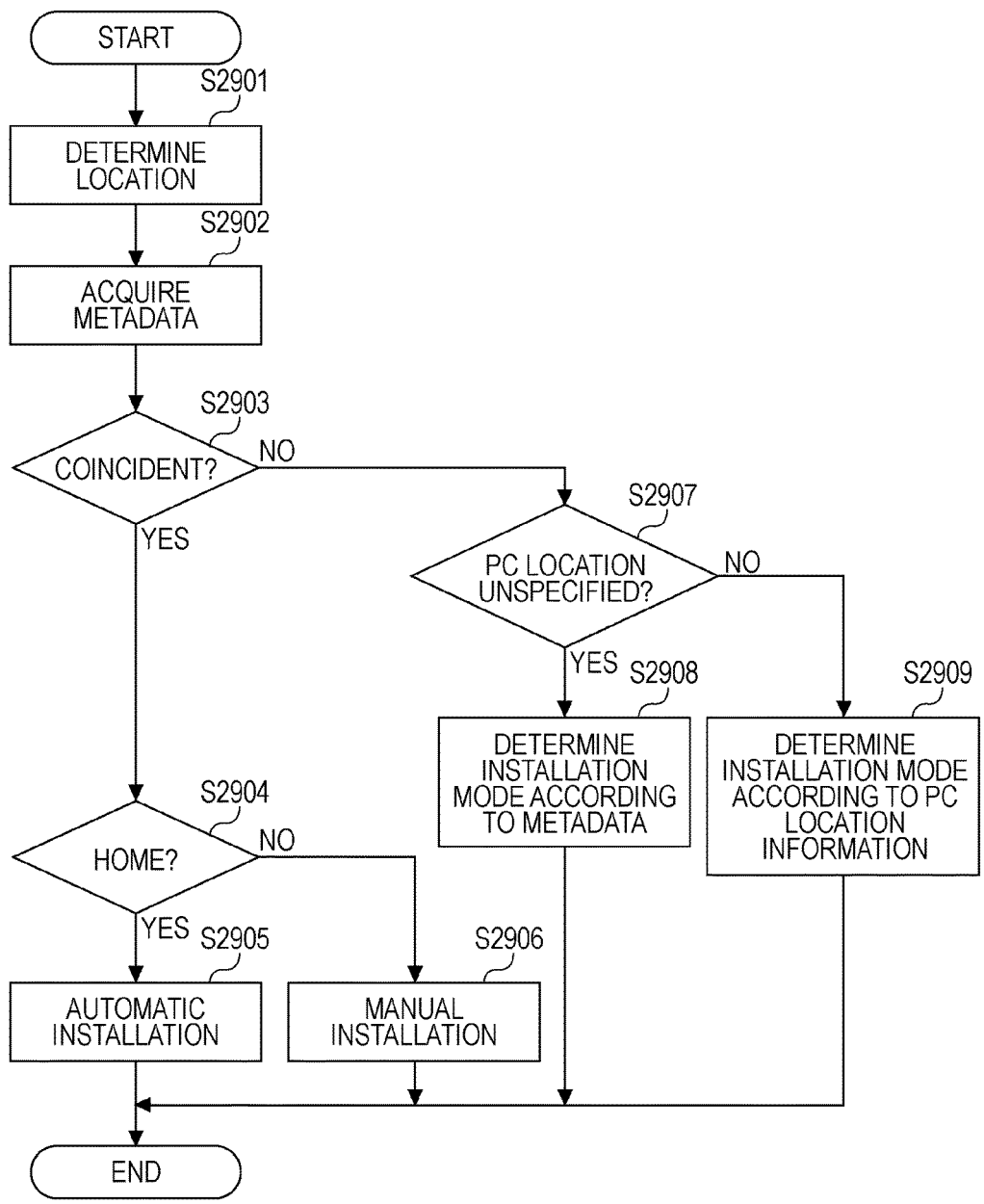
FIG. 29 is a flow chart illustrating a process of selecting an installation mode.

In FIG. 29, step S2901 is similar to step S2801 in FIG. 28, and step S2902 is similar to step S1203 in FIG. 12 (or step S1403 in FIG. 14) and thus a further detailed explanation thereof is omitted.

The PC 1 determines whether the location information of the PC 1 confirmed in step S2901 is in agreement with the location information described in the "npnp:Location" data element of the metadata acquired in step S2902 (step S2903).

If it is determined in step S2903 that the location information is in agreement, then the PC 1 determines whether "Home" is specified by the location information (step S2904). If "Home" is specified, the automatic installation is selected but otherwise the manual installation is selected as the installation mode.

On the other hand, in a case where it is determined in step S2903 that the location information is not in agreement (that is, if the answer to step S2903 is No), then the PC 1 determines whether the location information acquired in step S2901 indicates that the location is "Unspecified" (step S2907).

If the answer to step S2907 is Yes, then the PC 1 determines on the basis of the metadata acquired in step S2902 whether the installation should be performed in the automatic installation mode or the manual installation mode. More specifically, if "Home" is specified in "npnp:Location" of the metadata, the automatic installation mode is selected, but otherwise the manual installation mode is selected.

On the other hand, in a case where it is determined that the location of the PC 1 is specified (that is, if the determination in step S2907 is No), the PC 1 determines the installation mode according to the location information of the PC 1 (step S2909).

High priority is given to the location information in the determination in step S2909 for the following reason.

The location information of the PC 1 is set by a user. On the other hand, "npnp:Location" of the peripheral apparatus is set in advance according to the function of the peripheral apparatus. For example, for a large-size MFP using electrophotography, a manufacturer sets "Office" in "npnp:Location". However, this MFP is not necessarily installed in an office but a user may install it in a home environment. This means that the location information defined in advance depending on the function of the peripheral apparatus is not necessarily proper information according to which to select the installation mode. In the present embodiment, in view of the above, when the location information is not in agreement, the location information specified by a user is used to properly select the installation mode.

Furthermore, in this fourth embodiment, unlike the third embodiment, the installation mode is determined according to both the location information of the PC 1 and the "npnp:Location" information. Use of these two pieces of information makes it possible to reduce the probability that a wrong installation mode is selected.

Figure 30:
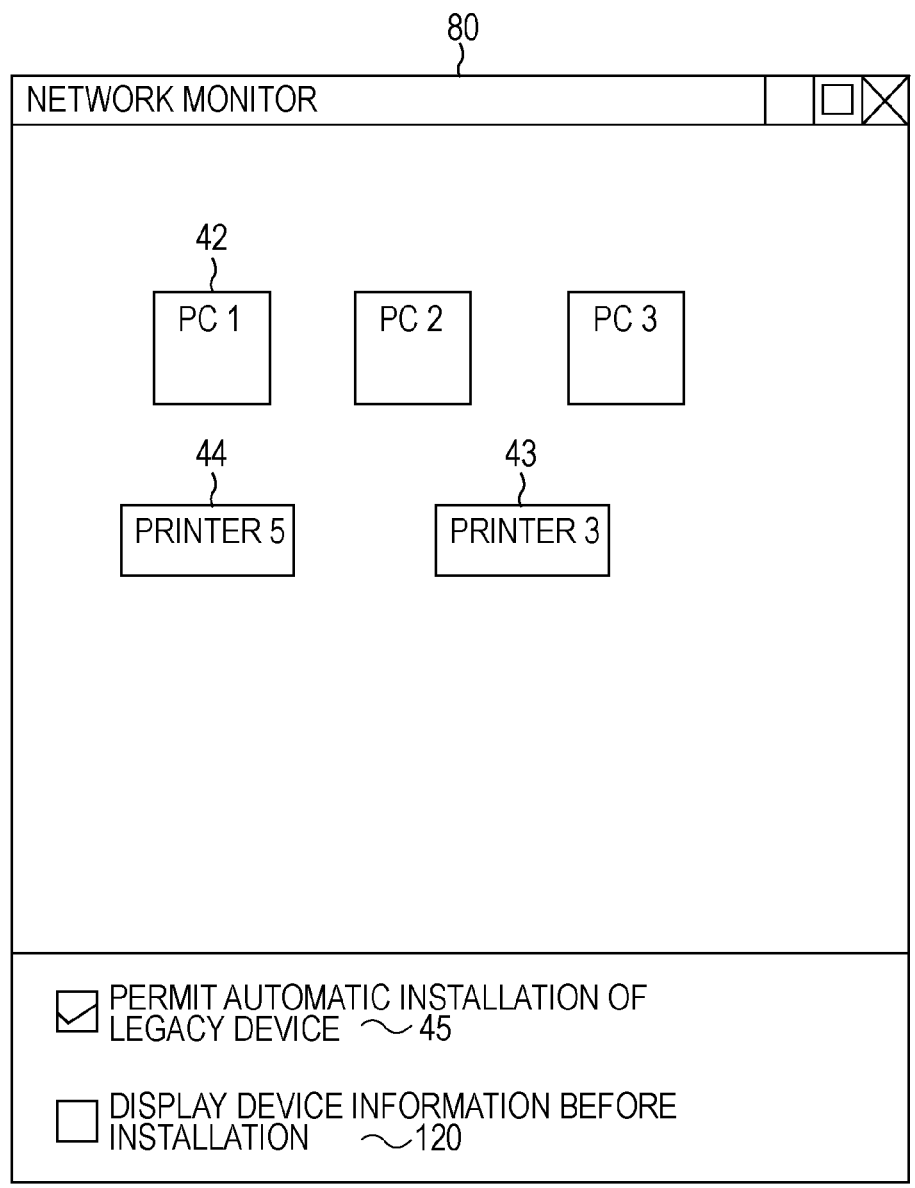
FIG. 30 is a diagram illustrating a network monitor.
Figure 31:
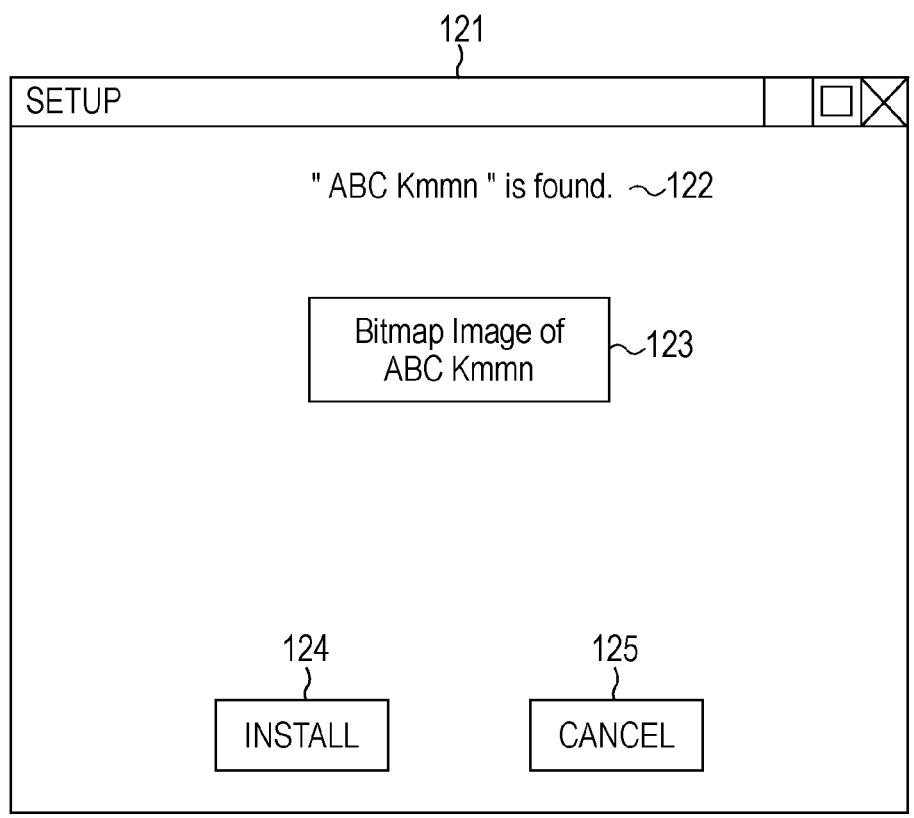
FIG. 31 is a diagram illustrating a device confirmation dialog.

FIG. 30 is a diagram illustrating a network monitor 80. The network monitor 80 shown in FIG. 30 is similar to the network monitor shown in FIG. 7 except that the network monitor 80 additionally includes a check box 120 that allows a user to specify whether to display device information before installation is performed. Depending on whether the check box 120 is checked or unchecked, a device confirmation dialog shown in FIG. 31 is displayed or not displayed. In the example shown in FIG. 30, the check box 120 is in an unchecked state. If this check box 120 is checked, a device confirmation dialog shown in FIG. 31 is displayed before the installation is started. However, if the check box 120 is unchecked, the installation is started without displaying the device confirmation dialog shown in FIG. 31.

Referring to FIG. 31, the device confirmation dialog is described below. In FIG. 31, reference numeral 121 denotes the device confirmation dialog. If the check box 120 is in the checked state, the device confirmation dialog 121 is displayed before the installation is started. Reference numeral 122 denotes a device information display field. In this device information display field 122, information acquired from a device to be installed is displayed. The information displayed may include a manufacturer name, a model name, etc, of the device to be installed. Reference numeral 123 denotes a device image display box. In this device image display box 123, image information such as bitmap image information acquired from the device to be installed is displayed. In FIG. 31, by way of example, image information acquired from the printer 3 to be installed is displayed in the device image display box 123. Reference numeral 124 denotes an install button. If the install button 124 is clicked, the installation of a driver of the device is started. Reference numeral 125 denotes a cancel button. If the cancel button 125 is clicked, the installation of the driver of the device is cancelled. The timing of displaying the device confirmation dialog 121 may be set, for example, such that it is displayed immediately after the automatic installation in step S1211 in FIG. 12 is started. By displaying the device confirmation dialog 121 in the above-described manner before the automatic installation is started, it becomes possible to prevent a driver of an unintended device from being automatically installed, i.e., it becomes possible to install a driver of a correct device. More specifically, for example, in a state where a total of two printers for shared use are installed at a home such that one printer is installed on the first floor and the other on the second floor, when a user wants to set up his/her personal computer such that only a driver of the printer located on the second floor is installed in his/her personal computer, the printer located on the first floor is an "unintended device." In this case, the displaying of the device confirmation dialog 121 makes it possible for the user to correctly install only the driver of the printer located on the second printer without installing the driver of the printer located on the first floor.

Next, referring to a memory map shown in FIG. 26, an explanation is given as to a configuration of a data processing program readable by a printing system including an information processing apparatus and a peripheral apparatus connected to each other so that they are capable of communicating with each other, according to an embodiment of the present invention.

The memory map shown in FIG. 26 is of a storage medium in which various kinds of data processing programs are stored in a form readable by the printing system according to the present embodiment of the invention.

Although not shown in FIG. 26, information according to which to manage the programs stored in the storage medium, such as version information, a supplier name, etc., may also be stored in the storage medium. Furthermore, information depending on the OS that reads the programs, such as icon information identifying each program may also be stored. In FIG. 26, reference numeral 130 denotes a storage medium. A hard disk or the like may be used as the storage medium. In the following explanation, it is assumed by way of example that a hard disk is used as the storage medium. Reference numeral 131 denotes a directory information management area that manages data associated with the respective programs. Reference numeral 132 denotes a program storage area. The various kinds of programs described above are stored in this program storage area 132. In addition, the program storage area 132 may further store a program for installing the programs in the information processing apparatus, a program for decompressing a compressed program to be installed, and/or other programs. The functions realized by executing the processes described above with reference to FIGS. 12 to 15 according to the embodiments of the invention may be implemented on the information processing apparatus by programs installed from the outside. In this case, a set of information including a control program may be supplied to the information processing apparatus or the peripheral apparatus from a storage medium such as a CD-ROM disk, a flash memory, or a flexible disk or from an external storage medium via a network. Note that this technique also falls within the scope of the present invention.

One or more embodiments of the present invention may be implemented by supplying a storage medium in which a control program code that implements one or more functions of the embodiments is stored, and executing the control program code stored in the storage medium by a computer (a CPU or an MPU) of a printing system or an apparatus. In this case, the control program code read from the storage medium implements the novel functions disclosed in the embodiments described above, and the storage medium on which the control program code is stored fall within the scope of the present invention. Storage media which can be employed in the present invention to supply the program code include a floppy disk, a hard disk, an optical disk, a magneto-optical disk, a CD-ROM, a CD-R, a magnetic tape, a non-volatile memory card, a ROM, and an EEPROM. In the execution of the program code by the computer, the operating system (OS) or the like running on the computer may execute all or part of the process thereby to implement one or more functions of one or more embodiments described above. Note that this technique also falls within the scope of the present invention.

In the embodiments described above, the network monitor such as that shown in FIG. 7 or FIG. 22 is taken as an example of the application 80 or 81. However, the applications are not limited to the network monitor. The present invention is also useful in other applications in which a driver of a peripheral apparatus is installed in a PC.

In the embodiments described above, the color ink-jet printer is used as an example of the printer. However, the printer is not limited to the color ink-jet printer. For example, a monochrome laser beam printer or other types of printers may be used.

In the embodiments described above, the personal computer is used as the information processing apparatus. However, the information processing apparatus is not limited to the personal computer. Other types of information processing apparatuses, such as a DVD player, a game machine, a settop box, an Internet home apparatus, etc., may be used.

In the embodiments described above, it is assumed that the peripheral apparatus is a printer. However, the peripheral apparatus is not limited to the printer. Other types of peripheral apparatuses, such as a copy machine, a facsimile machine, a scanner, a digital camera, or an apparatus having two or more of the functions described above may be used.

In the embodiments described above, it is assumed that the OS is the Windows Vista or an OS compatible therewith. Alternatively, other OSs may be used.

In the embodiments described above, it is assumed that the network 4 is one based on the Ethernet technology. Alternatively, other types of networks may be used.

In the embodiments described above, the interface between the PC 1 and the printer 3 is one based on Ethernet. However, the interface is not limited to that, and other interfaces such as a wireless LAN, an IEEE1394 interface, a Bluetooth interface, etc. may be employed.

In the embodiments described above, WSD is employed as the Web service protocol. Alternatively, other protocols such as an IHV-specific protocol may be used.

In the embodiments described above, a driver of a peripheral apparatus is installed (set up) in an information processing apparatus in either the automatic installation mode or the manual installation mode. However, the installation modes are not limited to these two modes. For example, other installation modes such as a semi-automatic installation mode may be used. The number of installation modes is not limited to two, but three or more installation modes may be used.

In the embodiments described above, an optimum setup (installation) mode is selected from a plurality of setup modes according to a location defined for an information processing apparatus and a location defined for a peripheral apparatus, and the setup of the information processing apparatus as to the peripheral apparatus is performed in the selected setup mode. Alternatively, an optimum setup mode may be selected from a plurality of setup modes according to a location (an environment) defined for an information processing apparatus, and the setup of the information processing apparatus as to a peripheral apparatus may be performed in the selected setup mode. Alternatively, an optimum setup mode may be selected from a plurality of setup modes according to a location (an environment) defined for a peripheral apparatus, and the setup of an information processing apparatus as to the peripheral apparatus may be performed in the selected setup mode. Thus the present invention makes it possible to select an optimum installation mode depending on an environment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A printing apparatus comprising:
   a processor,
   wherein the processor sets location information, not being IP address, by user operation using a setting dialog;
   transmits the set location information to an information processing apparatus;
   performs processing based on information for identification transmitted from the information processing apparatus; and
   performs printing based on print data transmitted by the user operation on the information processing apparatus,
   wherein the processing based on the information for identification is performed by the printing apparatus after the set location information is transmitted to the information processing apparatus and before the print data is transmitted from the information processing apparatus, and
   wherein the set location information is used for processing related to a software generating the print data on the information processing apparatus,
   wherein an automatic installation process of the software generating the print data by a printing instruction is selected in the information processing apparatus as the processing related to the software, in a case where the set location information is in agreement with location information of the information processing apparatus and both the set location information and the location information of the information processing apparatus indicate a home,
   wherein the automatic installation process of the software is automatically performed in accordance with connection of the printing apparatus to network environment, and
   wherein an installation process is selected from the automatic installation process and a manual installation process by preferentially using the location information of the information processing apparatus, in a case where the set location information is not in agreement with the location information of the information processing apparatus.

2. The apparatus according to claim 1, wherein the printing apparatus includes an ink-jet recording head.

3. The apparatus according to claim 1, wherein an automatic installation process of the software performing the printing instruction is selected as the processing related to the software in a case where the set location information is not in agreement with location information of the information processing apparatus and the location information of the information processing apparatus indicates a home, while a manual installation process of the software performing the printing instruction is selected in a case where the set location information is not in agreement with location information of the information processing apparatus and the location information of the information processing apparatus indicates a public environment.

4. The apparatus according to claim 1, further comprising:
   receiving a passcode as the identification information from the information processing apparatus, and
   confirming whether the received passcode is valid,
   wherein a confirmation result is transmitted to the information processing apparatus, and
   wherein the automatic installation process is performed as the processing related to the software in a case where the confirmation result is valid, the set location information is in agreement with location information of the information processing apparatus and both the set location information and the location information of the information processing apparatus indicate a home.

5. The apparatus according to claim 1, wherein the printing apparatus includes a display unit displaying the setting dialog, a printing function and another function, the another function being at least one of a copying function, a facsimile function and a scan function.

6. A control method to be performed on a printing apparatus, the method comprising:
   setting location information, not being IP address, by user operation using a setting dialog;
   transmitting the set location information to an information processing apparatus;

performing processing based on information for identification transmitted from the information processing apparatus; and performing printing based on print data transmitted by the user operation on the information processing apparatus, wherein the processing based on the information for identification is performed by the printing apparatus after the set location information is transmitted to the information processing apparatus and before the print data is transmitted from the information processing apparatus, and wherein the set location information is used for processing related to a software generating the print data on the information processing apparatus, wherein an automatic installation process of the software generating the print data by a printing instruction is selected in the information processing apparatus as the processing related to the software, in a case where the set location information is in agreement with location information of the information processing apparatus and both the set location information and the location information of the information processing apparatus indicate a home, wherein the automatic installation process of the software is automatically performed in accordance with connection of the printing apparatus to network environment, and wherein an installation process is selected from the automatic installation process and a manual installation process by preferentially using the location information of the information processing apparatus, in a case where the set location information is not in agreement with the location information of the information processing apparatus.

7. The method according to claim 6, wherein an automatic installation process of the software performing the printing instruction is selected as the processing related to the software in a case where the set location information is not in agreement with location information of the information processing apparatus and the location information of the information processing apparatus indicates a home, while a manual installation process of the software performing the printing instruction is selected in a case where the set location information is not in agreement with location information of the information processing apparatus and the location information of the information processing apparatus indicates a public environment.

8. The method according to claim 6, further comprising:
receiving a passcode as the information for identification from the information processing apparatus, and
confirming whether the received passcode is valid as the processing based on the information for identification transmitted from the information processing apparatus,
wherein a confirmation result is transmitted to the information processing apparatus, and
wherein the automatic installation process is performed as the processing related to the software in a case where the confirmation result is valid, the set location information is in agreement with location information of the information processing apparatus and both the set location information and the location information of the information processing apparatus indicate a home.

9. The method according to claim 6, wherein the printing apparatus includes a display unit displaying the setting dialog, a printing function and another function, the another function being at least one of a copying function, a facsimile function and a scan function.

10. The method according to claim 6, wherein the printing apparatus includes an ink-jet recording head.

* * * * *